US009145502B2

(12) United States Patent
Brust et al.

(10) Patent No.: US 9,145,502 B2
(45) Date of Patent: Sep. 29, 2015

(54) AQUEOUS INK JET INK COMPOSITIONS AND USES

(71) Applicants: Thomas B. Brust, Webster, NY (US); Catherine A. Falkner, Rochester, NY (US); Anne Troxell Wyand, Victor, NY (US)

(72) Inventors: Thomas B. Brust, Webster, NY (US); Catherine A. Falkner, Rochester, NY (US); Anne Troxell Wyand, Victor, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 13/850,510

(22) Filed: Mar. 26, 2013

(65) Prior Publication Data

US 2014/0295152 A1   Oct. 2, 2014

(51) Int. Cl.
| | |
|---|---|
| *C08G 18/08* | (2006.01) |
| *C08K 3/20* | (2006.01) |
| *C08L 75/00* | (2006.01) |
| *C09D 5/00* | (2006.01) |
| *C09D 11/00* | (2014.01) |
| *C09D 11/30* | (2014.01) |
| *B41J 2/015* | (2006.01) |
| *C09D 175/04* | (2006.01) |
| *C08L 75/04* | (2006.01) |
| *C08J 3/05* | (2006.01) |
| *C09D 11/32* | (2014.01) |
| *C08J 3/20* | (2006.01) |
| *C09D 11/023* | (2014.01) |
| *C08G 18/00* | (2006.01) |

(52) U.S. Cl.
CPC ............... *C09D 11/30* (2013.01); *B41J 2/015* (2013.01); *C08G 18/00* (2013.01); *C08G 18/0823* (2013.01); *C08J 3/05* (2013.01); *C08J 3/203* (2013.01); *C08L 75/04* (2013.01); *C09D 11/023* (2013.01); *C09D 11/32* (2013.01); *C09D 175/04* (2013.01); *C08J 2375/04* (2013.01); *C08J 2475/04* (2013.01); *C08L 2201/54* (2013.01); *Y10T 428/24901* (2015.01)

(58) Field of Classification Search
CPC .......... C08J 3/05; C08J 3/203; C08J 2375/04; C08J 2333/08; C08J 2333/10; C08J 2333/12; C08J 2433/08; C08J 2433/10; C08J 2433/12; C08J 2475/04; C08G 18/00; C08G 18/0823; C08L 33/08; C08L 33/10; C08L 33/12; C08L 75/04; C08L 2201/54; C09D 5/022; C09D 7/007; C09D 11/023; C09D 11/30; C09D 11/32; C09D 133/08; C09D 133/10; C09D 175/04; C09D 133/12

USPC .......... 523/160, 161, 200; 524/507, 591, 839, 524/840

See application file for complete search history.

(56) References Cited

U.S. PATENT DOCUMENTS

| | | | |
|---|---|---|---|
| 5,959,003 A | 9/1999 | Lo et al. | |
| 5,990,202 A | 11/1999 | Nguyen et al. | |
| 8,187,371 B2 | 5/2012 | Brust et al. | |
| 8,192,008 B2 | 6/2012 | Brust et al. | |
| 2005/0004306 A1 | 1/2005 | Lubnin et al. | |
| 2006/0100306 A1 | 5/2006 | Yau et al. | |
| 2006/0100308 A1 | 5/2006 | Yau et al. | |
| 2008/0207811 A1 | 8/2008 | Brust et al. | |
| 2009/0169748 A1 | 7/2009 | House et al. | |
| 2009/0169749 A1 | 7/2009 | Brust et al. | |
| 2010/0055322 A1 | 3/2010 | Brust et al. | |
| 2012/0050380 A1 | 3/2012 | Falkner et al. | |
| 2012/0050387 A1* | 3/2012 | Nakata et al. | 347/20 |
| 2012/0156375 A1 | 6/2012 | Brust et al. | |
| 2013/0245157 A1* | 9/2013 | Kuriyama et al. | 523/201 |

FOREIGN PATENT DOCUMENTS

WO   WO 2012/073563   *   6/2012

OTHER PUBLICATIONS

U.S. Appl. No. 13/334,125, titled "Inkjet Ink Composition," by Thomas B. Brust et al., filed Dec. 22, 2011.
U.S. Appl. No. 13/334,130, titled "Inkjet Printing Method and System," by Thomas B. Brust et al., filed Dec. 22, 2011.
U.S. Appl. No. 13/334,139, titled "Polymer Composition," by Thomas B. Brust et al., filed Dec. 22, 2011.

* cited by examiner

*Primary Examiner* — Patrick Niland
(74) *Attorney, Agent, or Firm* — J. Lanny Tucker

(57) ABSTRACT

Aqueous ink jet ink compositions can be used for ink jet printing colored or invisible images on receiver elements. These compositions contain a polymeric agent comprising core-shell polymeric particles. The core of the particles comprises a hydrophobic polymer having an acid number less than 10. The shell of the particles comprises a hydrophilic polymer having an acid number of at least 70. The weight ratio of the core to the shell is at least 50:50 and up to and including 90:10. Such compositions can be used in various ink jet printing systems including drop on demand and continuous ink jet printing systems.

10 Claims, No Drawings

AQUEOUS INK JET INK COMPOSITIONS AND USES

FIELD OF THE INVENTION

This invention relates in general to the field of colored and colorless ink jet ink compositions for ink jet printing. In particular, it relates to aqueous ink jet ink compositions and methods for ink jet printing and image formation using this composition.

BACKGROUND OF THE INVENTION

Ink jet printing is a non-impact method for producing printed images by the deposition of ink drops in a pixel-by-pixel manner to an image-recording receiver element in response to digital signals.

There are various methods that can be utilized to control the deposition of ink drops on the receiver element to yield the desired ink jet printed image. Ink jet printing systems are generally of two types: drop-on-demand (DOD) printing systems and continuous ink jet (CIJ) printing systems. For DOD printing systems, individual drops are projected as needed onto the receiver element. Common methods of controlling the ejection of ink drops in DOD printing include thermal bubble formations (thermal inkjet or TIJ) and piezoelectric transducers. The direction of the stream of droplets is controlled electronically in causing the droplets to print the desired image or information on the substrate surface without requiring contact between the printing device and the surface to which the ink is applied. Ink jet printers have found broad applications across markets ranging from desktop document and photographic-quality imaging, to short run printing and industrial labeling. Objects, comprising substrates to which ink jet printing is well suited include but are not limited to, containers for consumer products, currency, draft checks, envelopes, letterhead, identification cards, lottery tickets, bank cards, identification strips, labels, and other well known materials.

Drop-on-demand printing systems are widely used in home or consumer ink jet printers and slower commercial printers, both of which have been available for several decades. As the name implies, this type of ink jet printing uses a print head that ejects drops of ink only when signaled to do so by a digital controller.

CIJ printing systems generally comprise two main components, a fluid system (including an ink reservoir) and one or more print heads. Ink can be pumped through a supply line from the ink reservoir to a manifold that distributes the ink to a plurality of orifices, typically arranged in linear array(s), under sufficient pressure to cause ink streams to issue from the orifices of the print head(s). Stimulations can be applied to the print head(s) to cause those ink streams to form streams of uniformly sized and spaced drop, which are deflected in a suitable manner, into printing or non-printing paths. Non-printing drops are returned to the ink reservoir using a drop catcher and a return line. Thus, in contrast to DOD printing systems, CIJ printing systems involves use of a continuous stream of ink drops that are separated to discriminate between printing drops and non-printing drops. This discrimination can be accomplished by electrostatically charging the drops and passing the charged drops through an electric field. Charged drops are deflected by a charge field and can be caught and returned to the reservoir of ink. Uncharged drops are printed on a substrate or receiver material. Some useful CIJ printing apparatus and print head fabrication are described for example in U.S. Pat. No. 6,588,888 (Jeanmaire et al.) and U.S. Pat. No. 6,943,037 (Anagnostopoulos et al.).

More recent innovations in CIJ printing systems include the use of silicon print head nozzles with heaters built into them. These print head nozzles respond to an electronic signal and change the physical characteristics of drops being ejected. Heated drops "catch up" in velocity with non-heated drops in the emission space. Multiple drops can combine to form a "printed drop" that is printed onto the substrate or receiver material. Single drops can be caught by an air stream and returned to the ink reservoir for use a future use.

Commercially available CIJ inks are mostly aqueous dye-based inks that exhibit a number of problems. In such dye-based inks, no particles are observable under the microscope. Although there have been many recent advances in the art of dye-based ink jet inks, such inks still suffer from deficiencies such as low optical densities on coated glossy paper and poor light-fastness. When water is used as the carrier, such inks also generally suffer from poor water fastness and poor smear resistance.

Colored pigment-based inks have been proposed as a means of addressing limitations of dye based inks. In pigment-based inks, the colorant exists as discrete particles. Pigment dispersions known in the art include self-dispersing pigment dispersions, dispersant stabilized pigment dispersions and encapsulated pigment dispersions. For non-self-dispersive pigments, the pigment particles are usually treated with addenda known as dispersants or stabilizers that serve to keep the pigment particles from agglomerating or settling out. Useful pigment-based inks for CIJ printing systems are described for example in U.S. Patent Application Publications 2010/0304028 (Sowinski et al.) and 2011/0122180 (Cook et al.).

In general, such pigment-based inks can comprise a wide variety of colored pigments that can be chosen depending upon the specific application and performance requirements for the printing system and desired printing results. For example, such pigments can include but are not limited to, carbon black or other black pigments, red pigments, green pigments, blue pigments, orange pigments, violet pigments, magenta pigments, yellow pigments, and cyan pigments. The printed images using such pigment-based inks are generally desired to have a visual density of at least 0.5.

Colorless or invisible aqueous ink jet printer ink compositions containing various fluorescing pigments, and optionally colored non-fluorescing pigments, are described in U.S. Pat. No. 8,349,211 (Cai et al.) and in copending and commonly assigned U.S. Ser. No. 13/769,504 (filed Feb. 18, 2013 by Cook).

Ink jet printer ink compositions containing colorants or invisible components can be classified as either pigment-based, in which the colorant or invisible components exist a pigment particles suspended in the composition, or as dye-based in which the colorant or invisible component exists as a fully solvated dye species comprising one or more dye molecules.

A pigment is generally more desirable because it is more resistant to fading than a dye. However, pigments have a number of drawbacks. Pigments must be physically milled to produce particles of desired small size to provide sufficient colloidal stability to the particles. If the pigments particles are too large, resulting light scattering can have a detrimental effect on optical density and gloss in the resulting printed image.

A second drawback of pigmented ink compositions is their durability after printing on the receiver elements, especially under conditions where abrasive forces have been applied to the printed images. Furthermore, the printed images on the receiver elements are susceptible to defects at short time intervals, from immediately after printing to several minutes while the ink jet printer ink compositions are drying. In addition, the durability of the dried printed images is also subject to environmental factors such as temperature and humidity that, under certain circumstances, can degrade image durability.

To solve these various problems, pigmented aqueous ink jet ink compositions have been formulated with various polymers, dispersants, and other addenda to provide durable images that can withstand post printing physical abuse and environmental conditions. For example, such compositions have been formulated with various acrylic polymers, polyurethane, or mixtures thereof as described for example in U.S. Pat. No. 8,187,371 (Brust et al.). The described polyurethanes have an acid number of from 60 to about 130. Similar compositions are described in U.S. Patent Application Publication 2008/0207811 (Brust et al.) and U.S. Pat. No. 8,192,008 (Brust et al.). Polyurethane/urea polymers are described as additives in U.S. Patent Application Publications 2009/0169748 (House et al.), 2009/0169749 (Brust et al.), and 2012/0050380 (Falkner et al).

While the noted aqueous ink jet ink compositions provide improvements in ink jet printed images, when the polyurethane has a high acid number, it can absorb too much moisture in high humidity environments. Yet, if the acid number is too low, ink jetting becomes poor such that it is non-uniform and unacceptable at high jetting speeds.

Thus, there is a need for a polymeric additive for aqueous ink jet ink compositions that have the desired durability once ink jet printed onto various receiver elements, but which also are ink jettable in a uniform and high speed manner.

SUMMARY OF THE INVENTION

The present invention provides an aqueous ink jet ink composition comprising:
a visible or invisible colorant, and
a polymeric agent comprising core-shell polymeric particles,
wherein the core of the core-shell polymeric particles comprises a hydrophobic polymer having an acid number less than 10, and the shell of the core-shell polymeric particles comprises a hydrophilic polymer having an acid number of at least 70, and the weight ratio of the core to the shell is at least 50:50 and up to and including 90:10.

In addition, the present invention also provides an aqueous ink jet ink composition comprising:
a polymeric agent comprising core-shell polymeric particles that is present in an amount of at least 0.5 weight % and up to and including 10 weight %,
wherein the core of the core-shell polymeric particles comprises a hydrophobic polymer having an acid number less than 10, and the shell of the core-shell polymeric particles comprises a hydrophilic polymer having an acid number of at least 70, and the weight ratio of the core to the shell is at least 50:50 and up to and including 90:10.

The present invention also provides a method of ink jet printing, comprising:
providing the aqueous ink jet ink composition of any embodiment of this invention,
delivering the aqueous ink jet ink composition to a drop generator mechanism, and ejecting the aqueous ink jet printer ink composition from the drop generator mechanism, and
controlling the spaced drops to image a receiver element.

For example, the method of this invention can be carried out using continuous ink jet printing or drop on demand printing systems.

In other embodiments of this invention, a method for forming an image comprises ink jet printing a receiver element with the aqueous ink jet ink composition of any embodiment of this invention, using an ink jet printer.

In addition, the present invention provides a receiver element that has been imaged according to the method of any embodiment of this invention, and having thereon an ink jet printed image comprising a visible or invisible colorant, and a polymeric agent comprising core-shell polymeric particles,
wherein the core of the core-shell polymeric particles comprises a hydrophobic polymer having an acid number less than 10, and the shell of the core-shell polymeric particles comprises a hydrophilic polymer having an acid number of at least 70, and the weight ratio of the core to the shell is at least 50:50 to and including 90:10.

In still other embodiments, a receiver element that has been imaged according to any embodiment of the method of this invention, and having thereon an ink jet printed image comprising a polymeric agent comprising core-shell polymeric particles,
wherein the core of the core-shell polymeric particles comprises a hydrophobic polymer having an acid number less than 10, and the shell of the core-shell polymeric particles comprises a hydrophilic polymer having an acid number of at least 70, and the weight ratio of the core to the shell is at least 50:50 to and including 90:10.

The ink jet ink compositions of this invention contain unique core-shell polymer particles that provide desired durability of the ink jet printed images. Yet, the compositions are readily ink jet printed at high speeds in a uniform manner on a variety of receiver elements. These advantages are provided by including the core-shell polymer particles in which the core is highly hydrophobic and has a very low acid number while the shell is highly hydrophilic and has an acid number of at least 70.

DETAILED DESCRIPTION OF THE INVENTION

Definitions

As used herein to define various components of the aqueous ink jet ink compositions, formulations, and ink jet printed layers, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term's definition should be taken from a standard dictionary.

The use of numerical values in the various ranges specified herein, unless otherwise expressly indicated otherwise, are considered to be approximations as though the minimum and maximum values within the stated ranges were both preceded by the word "about". In this manner, slight variations above and below the stated ranges can be used to achieve substantially the same results as the values within the ranges. In addition, the disclosure of these ranges is intended as a continuous range including every value between the minimum and maximum values.

By "aqueous," the term is meant that the composition comprises mainly water as the carrier medium for the remaining composition components.

Unless otherwise indicated, the terms "aqueous ink jet ink composition," "ink composition," and "composition" are meant to refer to embodiments of the present invention.

Unless otherwise indicated, the term "visible colorant" refers to a colorant that exhibits a detectable color or hue with the unaided human eye, for example reflecting radiation or transmitting at a wavelength of at least 400 nm and up to and including 750 nm.

Unless otherwise indicated, the term "invisible colorant" refers to a colorant that does not exhibit a detectable color or hue with the unaided human eye. Such colorants can be fluorescent when excited at an appropriate wavelength.

Acid number is a measure of acidity and is also known as "neutralization number," and can be generally defined as mass of potassium hydroxide (KOH) in milligrams that is required to neutralize one gram of a dry polymer composition (either the shell polymer or core polymer). Thus, acid number can be in terms of mg (KOH) per gram of a given dry polymer composition. Determining acid number is possible using procedures known in the art.

Aqueous Ink Jet Ink Compositions

In some embodiments of this invention, the aqueous ink jet ink composition of the invention comprises one or more visible colorants or invisible colorants (as described below), or both, a polymeric agent comprising core-shell polymeric particles (described below), and an aqueous medium comprising water. These are the only essential components to provide the desired image properties. Optional components described can be present also to enhance or optimize various properties. The compositions typically comprise at least 80 weight % of water or at least 90 weight % of water, based on total composition weight.

In other embodiments of this invention, the aqueous ink jet ink composition of this invention is "colorless" because it does not contain any visible colorants. Such aqueous ink jet compositions can be used to provide essentially clear overcoats in continuous coatings or ink jet printed images. Colorless ink compositions can also contain luminescent colorants that can be used to provide invisible indicia when viewed with visible radiation, but fluoresce or phosphoresce when exposed to non-visible radiation, such as ultraviolet radiation.

Polymeric Agents

The most essential component of the compositions of this invention consists of core-shell polymeric particles that provide the desired property of ink jet printed image durability. Such polymeric particles can be prepared using known procedures that are generally described below and described in the working examples.

For example, the core of the core-shell polymeric particles comprises one or more hydrophobic polymers, each independently having an acid number of less than 10 or even less than 5 or from 0 and up to and including 5. Acid number can be determined as described above.

Any of the many hydrophobic polymers can be used for this purpose including but not limited to, polyurethanes (such as polyether polyurethanes, polycarbonate polyurethanes, polysiloxane-containing polyurethanes, and polyester polyurethanes) or polyacrylates (polymers having at least 50 mol % recurring units derived from one or more acrylate or methacrylate ethylenically unsaturated polymerizable monomers, based on total recurring units). The hydrophobic polymers can be used in mixtures of the same or different chemical types of materials. These hydrophobic polymers can be prepared using known starting materials and reaction conditions. Some representative hydrophobic polymers can also be obtained from various commercial sources.

Particularly useful hydrophobic polymers are the polyurethanes described above. Such hydrophobic polymers are generally prepared by reaction of one or more polyisocyanates having two or more isocyanate groups, for example two to four isocyanate groups and including one or more divalent aliphatic, cycloaliphatic, araliphatic, and aromatic groups. Mixtures of polyisocyanates can also be used. Certain small amounts of monamctional isocyanates can be included with one or more polyisocyanates to control molecular weight or to introduce other functional groups such as alkoxy silanes and ethylene urea. Useful polyisocyanates are described for example in [0102]-[0105] of U.S. Patent Application Publication 2005/0004306 (Lubnin et al.) the disclosure of which is incorporated herein by reference.

The polyisocyanates are generally reacted with one or more isocyanate reactive compounds that have a source of hydrogen and that can react with isocyanate groups via the following reaction:

—NCO+H—X→—NH—C(=O)—X to form urethane or other groups (such as urea groups). Such compounds can be generally divided into two groups: polyols and chain extenders. The isocyanate reactive compounds can also be known as "active-hydrogen containing compounds". Chain extenders are compounds having molecular weight below 500 Daltons and polyols are compounds having a number average molecular weight greater than 500 and up to and including 6,000 Daltons. Suitable active-hydrogen containing compounds include but are not limited to, polyols including polyether polyols, polycarbonate polyols, polyester polyols, polydimethyl-siloxane-containing polyols, polyamines, and compounds with a mixture of these functionalities. Representative useful compounds that are reactive with the polyisocyanates are described for example in [0108]-[0113] in U.S. Patent Application Publication 2005/0004306 (noted above).

The hydrophobic polymers used in the core of the core-shell particles generally have a minimum molecular weight ($M_w$) of at least 5,000 and a maximum $M_w$ of 150,000. The $M_w$ value can be determined by gel permeation chromatography or size exclusion chromatography (SEC). When a mixture of hydrophobic polymers is used, the $M_w$ values can be the same or different as long as the lowest $M_w$ in the mixture is at least 5,000.

The shell of the core-shell polymers useful in this invention comprises one or more hydrophilic polymers, having a cumulative acid number of at least 70, typically at least 80, and more typically at least 100, and up to and including 800, provided by one or more different acid groups, or hydrophilic groups. Acid number can be determined as described above. By "cumulative" acid number it is meant that the total of a mixture of hydrophilic polymers has the desired acid number but that one or more of a mixture of hydrophilic polymers can have an acid number less than 100 as long as other hydrophilic polymers in the mixture have an acid number, and the polymers are present in sufficient molar ratio of hydrophilic groups, that the cumulative acid number of the mixture of polymers is greater than 70 or even greater than 80.

Particularly useful shell polymers include one or more water-soluble or water-dispersible polyurethanes including mixtures of polyurethanes and polyacrylates, having a cumulative acid number of at least 70 or least 80 or more likely at least 100, as provided by acidic groups such as carboxy, phospho, or sulfo groups.

The hydrophilic polymers used in the shell of the core-shell particles generally have a minimum molecular weight ($M_w$) of at least 5,000 and a maximum $M_w$ of 150,000. The $M_w$ value can be determined by gel permeation chromatography. When a mixture of hydrophilic polymers is used, the $M_w$ values can be the same or different as long as the lowest $M_w$ in the mixture is at least 5,000.

Such shell polymers can be prepared using known starting materials and reaction conditions. For example, the water-soluble or water-dispersible polyurethanes can be prepared from one or more polyisocyanate (such as a diisocyanate) reacted with one or more isocyanate reactive compounds, as described above, as long as some of the isocyanate reactive compounds provide the desired hydrophilic groups (such as acidic groups).

For example, useful hydrophilic shell polymers can be described according to the Structure (I):

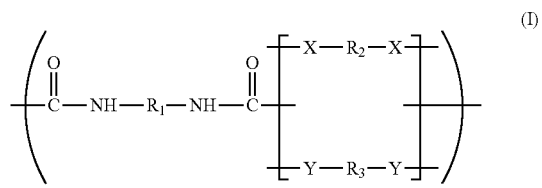

wherein $R_1$ is the central portion of recurring units (segments) derived from a polyisocyanate (diisocyanate), as described above, $R_2$ represents a recurring unit (segment) derived from a polyether, polycarbonate, polyester, or polysiloxane-containing polyol (or prepolymer) and having a molecular weight of at least 250 and up to and including 2900, $R_3$ represents a central portion of a recurring unit (segment) containing a hydrophilic group such as an acidic group, and X and Y can be the same or different and are oxygen or nitrogen atoms.

For example, in Structure (I), $R_1$ can be a divalent hydrocarbon group comprising a substituted or unsubstituted alicyclic, aliphatic, or aromatic group, or mixtures thereof. In Structure (I), $R_2$ can be a prepolymer comprising ethylene oxide, propylene oxide, tetramethylene oxide, or a mixture thereof that can be introduced into the polyurethane using any suitable polyol.

In Structure (I), $R_3$ can be obtained from polyols comprising phospho, carboxy, or sulfo groups, or a mixture thereof. Polyols comprising carboxy groups include but are not limited to, 2,2'-bis(hydroxymethyl)propionic acid, 2,2'-bis(hydroxymethyl)butanoic acid, and hydroxyether of 2,4'-bis(1-hydroxyphenyl)valeric acid.

For example, useful water-soluble or water-dispersible polyurethanes can be prepared by preparing prepolymers having a relatively low molecular weight and small excess of isocyanate groups and chain-extending with a chain extender the prepolymers into high molecular weight polyurethane during the dispersion process. More details about the manufacturing process are described for example in [0045]-[0049] of U.S. Patent Application Publication 2008/0207811 (Brust et al.) the disclosure of which is incorporated herein by reference.

Still other useful water-soluble or water-dispersible polyurethanes are described in U.S. Patent Application Publication 2009/0169748 (House et al.), the disclosure of which is incorporated herein by reference, particularly by general formula (I) in which $R_2$ represents recurring units (segments) derived from one or more polyols or polyamines such as those described in [0039] of the noted publication.

Moreover, other useful water-soluble or water-dispersible polyurethanes are described in general Structure (I) of U.S. Patent Application Publication 2009/0169749 (Brust et al.), the disclosure of which is incorporated herein by reference, in which $R_2$ represents recurring units (segments) derived from one type of polyamine prepolymers, $R_3$ represents recurring units (segments) derived from at least one type of polyol prepolymers, and $R_4$ represents recurring units comprising a hydrophilic groups such as an acid group. In such polyurethanes, within the total combination of recurring units (segments) comprising $R_2$ and $R_3$ groups, at least 4 weight % are polyamine prepolymers that can be derived from polyamines sold under the tradename Jeffamine® series of compounds.

Still other useful polyurethanes are described in [0024] to [0028] of U.S. Patent Application Publication 2012/0050380 (Falkner et al.) the disclosure of which is incorporated herein by reference, and in Cols. 4-7 of U.S. Pat. No. 8,192,008 (Brust et al.) the disclosure of which is incorporated herein by reference, such polyurethanes comprising recurring units (segments) comprising siloxane groups.

Yet other useful polyurethanes are in U.S. Pat. No. 8,304,370 (Kung et al.), the disclosure of which is incorporated herein by reference. Such polyurethanes are generally described by the following Structure (PB):

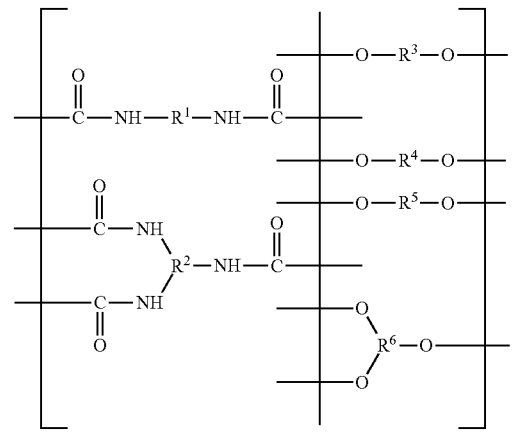

wherein $R^1$ and $R^2$ independently represent substituted or unsubstituted divalent aliphatic, cycloaliphatic, or aromatic groups in the recurring urethane units, $R^3$ represents a substituted or unsubstituted divalent alkylene group in the glycol recurring units, $R^4$ represents a divalent acid-substituted aliphatic group in the acid recurring units, and $R^5$ and $R^6$ independently represent divalent aliphatic carbonate groups in the carbonate recurring units.

For example, the divalent aliphatic, cycloaliphatic, and aromatic groups for $R^1$ and $R^2$ include substituted or unsubstituted organic groups having 1 to 20 carbon and other atoms in the divalent chain. Thus, these recurring units can be derived from a wide variety of mono- and polyisocyanates. The substituted or unsubstituted divalent alkylene groups for $R^3$ typically have from 1 to 10 carbon atoms in the divalent chain but they can be linear or branched groups and include for example, methylene, ethylene, isopropylene, n-butylene, and hexylene. The divalent acid-substituted aliphatic groups for $R^4$ generally have 1 to 10 carbon and other atoms in the divalent chain having at least one carbon atom to which at least one an acid group is attached. Useful acid groups include but are not limited to carboxylic acid, sulfonic acid, and phosphonic acid groups. These recurring units can be derived from a variety of acid-substituted diols similar to those defined above for $R^3$. The divalent aliphatic carbonate groups for $R^5$ and $R^6$ can have 1 to 20 carbon atoms and other atoms in the divalent aliphatic chain (for example hydrocarbon chain) and can be derived from various polycarbonate diols that would be readily apparent to one skilled in the art, and generally have a molecular weight of from about 200 and up to and including 3,000.

In the core-shell particles used in the present invention, the weight ratio of the core (one or more polymers) to the shell (one or more polymers) can be at least 50:50 and up to and including 70:30, or at least 50:50 and up to and including 90:10. These weight ratios can be designed by using certain amounts of core polymers and shell polymers in the formation of the core-shell polymer particles.

In some embodiments, the shell of the core-shell particles is composed of a polyurethane and the core of the core-shell particles is composed of a polyurethane. The core and shell polyurethanes can be the same or different as long as the different required acid number values are provided, for example by different amounts of acid groups or various recurring units provided within the polyurethanes. In most embodiments, the core and shell polyurethanes are compositionally different.

The core-shell particles used in the practice of this invention generally have a mean particle size of at least 0.1 μm and typically up to but less than 10 μm, or typically at least 0.1 μm and up to and including 3 μm, as determined by light scattering techniques.

The aqueous ink jet ink composition of this invention generally comprises the one or more polymeric agents described herein in an amount of at least 0.1 weight % and up to and including 20 weight % (% solids), or even at least 0.5 weight % and up to and including 10 weight %.

Visible or Invisible Colorants

The visible or invisible colorants useful in the practice of this invention can be used individually or in mixtures of two or more colorants. Useful colorants include visible or invisible fluorescent colorant as well as colored (visible) non-fluorescent colorants. In other embodiments, mixtures can include two or more colored (visible) non-fluorescent colorants, two or more visible or invisible fluorescent colorants, or mixture of both types of colorants.

A wide variety of fluorescent pigment particles can be used as colorants, for example, having an excitation peak wavelength of less than 400 nm, or more likely of at least 250 nm and up to and including 400 nm. Thus, they are readily excited generally by ultraviolet irradiation. As a result of this irradiation, the pigments emit at an emission peak wavelength that is greater 400 nm and up to and including 750 nm. While many of such fluorescent colorants are colorless (invisible), meaning they are essentially non-absorbing between 400 nm and 700 nm without excitation, the emission peak wavelength upon excitation can be in the blue, green, or red regions of the electromagnetic spectrum. Some fluorescent colorants can emit in the red region of the spectrum, that is of at least 600 nm and up to and including 700 nm, while others can emit the blue region (for example, at least 400 nm and up to and including 500 nm), or still others in the green region (for example, at least 500 nm and up to and including 600 nm). Other useful fluorescent colorants are visibly colored.

Such fluorescent colorants (pigment particles) generally have a median particle size that is greater than 10 nm and up to and including 500 nm or typically greater than 10 nm and up to and including 250 nm. More particularly, when used in continuous ink jet systems and methods that utilize ink recirculation, the median particle size is at least 10 nm and up to and including 150 nm. Moreover, the $95^{th}$ percentile fluorescent pigment particle size is less than 500 or more likely less than 150 nm. The median particle size and $95^{th}$ percentile particle size are determined using a Nanotrac Particle Size Analyzer (manufactured by Microtrac) using methods defined by the instrument manufacturer. Particles sizes can also be measured using Malvern or Horiba particle size analysis instruments using known procedures.

Useful fluorescent colorants can have various chemical compositions that would be known to skilled color chemists and are described in the *Pigment Handbook*, Temple C. Patton (Ed.), Wiley-Interscience, Vol. I, pp. 907-910, and Vol. II, pp. 892-903, 1973. Some useful commercial fluorescent colorants are available from Day-Glo Corporation (Cleveland, Ohio), Keystone Aniline Corporation (Chicago, Ill.), and Luminochem (Budapest, Hungary).

Other useful fluorescent colorants are described for example in U.S. Pat. No. 8,349,211 (noted above) and in U.S. Ser. No. 13/769,504 (noted above), the disclosures of both of which are incorporated herein by reference.

One or more different types of fluorescent colorants can be present in the aqueous ink jet ink composition in an amount of at least 0.1 weight % and up to and including 10 weight %, or typically of at least 0.3 weight % and up to and including 5 weight %.

In addition to, or alternatively to, the fluorescent colorants, the composition of this invention can comprise one or more colored, non-fluorescent colorants (usually as pigment particles). Such colorants can be used to provide a visible image of a desired color or hue. By "non-fluorescent", it is meant that such colorants do not fluoresce when irradiated at a wavelength of less than 400 nm to any appreciable extent.

A wide variety of organic and inorganic colorants can be used in this manner in some embodiments. For example, useful colorants of this type include but are not limited to those disclosed in, for example, U.S. Pat. No. 5,026,427 (Mitchell et al.), U.S. Pat. No. 5,085,698 (Ma et al.), U.S. Pat. No. 5,141,556 (Matrick), U.S. Pat. No. 5,160,370 (Suga et al.), and U.S. Pat. No. 5,169,436 (Matrick), the disclosures of which are incorporated herein by reference for the purpose of describing such pigments. The exact choice of colorant will depend upon the specific application and performance requirements such as color reproduction and image stability in the resulting ink jet printer images. For example, non-fluorescent colorants (usually in dispersed form) can be present in the aqueous ink jet ink compositions in an amount of at least 0.1 weight % and up to and including 10 weight % and more typically in an amount of at least 0.3 weight % and up to and including 5 weight %.

Colorants of this type that are suitable for inclusion in the aqueous ink jet ink compositions of this invention include, but are not limited to, azo pigments, monoazo pigments, di-azo pigments, azo pigment lakes, 13-Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, and titanium oxide. Carbon black and other "black" color pigments are also useful including but are not limited to carbon blacks available as Cab-O-Jet®, 200 and Cab-O-Jet® 300 carbon blacks (Cabot Corporation) and Bonjet® Black CW-1, CW-2, and CW-3 (Orient Chemical Industries, Ltd.).

Typical examples of colored pigments useful as colorants include but are not limited to Color Index (Cd.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, and 194; C.I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:34, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 300, 202, 204, 206, 207, 210, 211, 212, 213, 214, 216, 220, 222, 237, 238, 239, 240, 242, 243, 245, 247, 248, 251, 252, 253, 254, 255, 256, 258, 261, and 264; C.I. Pigment Blue 1, 2, 9, 10, 14, 15:1, 15:2, 15:3, 15:4, 15:6, 15, 16, 18, 19, 24:1, 25, 26, 52, 56, 60, 61, 63, 64, and 66, bridged aluminum phthalocyanine pigments; C.I. Pigment Black 1, 7, 20, 31, and 32; C.I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, and 69; C.I. Pigment Green 1, 2, 4, 7, 8, 10, 36, and 45; C.I. Pigment Violet 1, 2, 3, 5:1, 13, 19, 23, 25, 27, 29, 31, 32, 37, 39, 42, 44, and 50; and C.I. Pigment Brown 1, 5, 22, 23, 25, 38, 41, and 42.

The colorants useful in the present invention are generally pigments that have a median particle size that is greater than 10 nm and up to and including 500 nm, with the $05^{th}$ percentile colorant pigment particle size being less than 250 nm. In still other embodiments, the colorant is a pigment having a median particle size that is greater than 5 nm and up to and including 250 nm, with the $95^{th}$ percentile colorant pigment particle size is less than 150 nm.

While some of the colorants used in this invention are self-dispersing within the aqueous medium in the composition, in many embodiments, the aqueous ink jet ink composition of this invention is designed so that the invisible or visible colorants (pigment particles) are dispersed in the presence of a dispersant (or dispersing agent) that is present in an amount sufficient to provide a weight ratio of the dispersant to the colorant pigment particles of at least 1:10 and up to and including 1:2, or typically of at least 1:5 and up to and including 1:3.

The aqueous ink jet ink compositions of this invention can be prepared by any method known in the art of ink jet printing. Useful methods commonly involve two steps: (a) a dispersing or milling step to break up the colorant particles to primary particles, where primary particle is defined as the smallest identifiable subdivision in a particulate system, and (b) a dilution step in which the pigment dispersion from step (a) is diluted with the remaining composition components to give a working strength composition. The milling step (a) is carried out using any type of grinding mill such as a media mill, a ball mill, a two-roll mill, a three-roll mill, a bead mill, and air-jet mill, an attritor, or a liquid interaction chamber. In the milling step (a), colorant pigment particles are optionally suspended in an aqueous medium that is typically the same as or similar to the aqueous medium used to dilute the pigment dispersion in step (b). Inert milling medium is optionally present in the milling step (a) in order to facilitate break-up of the colorant particles to primary particles. Inert milling media include such materials as polymeric beads, glasses, ceramics, metals and plastics as described, for example, in U.S. Pat. No. 5,891,231 (Gnerlich et al.) the disclosure of which is incorporated herein by reference. The milling media described in this patent is particularly useful to obtain pigment dispersions of finer particle size. Milling media are removed from either the pigment dispersion obtained in step (a) or from the ink jet ink composition obtained in step (b).

A dispersant is optionally present in the milling step (a) in order to facilitate break-up of the colorant particles into primary particles. For the pigment dispersion obtained in step (a) or the ink jet ink composition obtained in step (b), a dispersant is optionally present in order to maintain particle stability and prevent settling. Dispersants suitable for use in the invention include, but are not limited to, those commonly used in the art of ink jet printing. Particularly useful dispersants include anionic, cationic or nonionic surfactants such as sodium dodecylsulfate, or potassium or sodium oleylmethyltaurate as described in, for example, U.S. Pat. No. 5,679,138 (Bishop et al.), U.S. Pat. No. 5,651,813 (Santilli et al.), or U.S. Pat. No. 5,985,017 (Bugner et al.), the disclosures of which are incorporated herein by reference.

Polymeric dispersants are also useful and can be added to the colorant dispersion prior to, or during the milling step (a), and include polymers such as homopolymers and copolymers; anionic, cationic or nonionic polymers, or random, block, branched, or graft polymers. Polymeric dispersants useful in the milling operation include random and block copolymers having hydrophilic and hydrophobic portions as described for example in U.S. Pat. No. 4,597,794 (Ohta et al.), U.S. Pat. No. 5,085,698 (Ma et al.), U.S. Pat. No. 5,519,085 (Ma et al.), U.S. Pat. No. 5,272,201 (Ma et al.), U.S. Pat. No. 5,172,133 (Suga et al.), U.S. Pat. No. 6,043,297 (Sano) and WO 2004/111140A1 (Spinelli), and graft copolymers described for example in U.S. Pat. No. 5,231,131 (Chu et al.), U.S. Pat. No. 6,087,416 (Pearlstine et al.), U.S. Pat. No. 5,719,204 (Beach et al.), and U.S. Pat. No. 5,714,538 (Beach et al.), the disclosures of which were incorporated herein by reference. Typically, these polymeric resins are copolymers made from hydrophobic and hydrophilic monomers. The copolymers are designed to act as dispersants for the colorants by virtue of the arrangement and proportions of hydrophobic and hydrophilic monomers. The colorant particles are stabilized by steric and ionic effect of the dispersant and can be referred to as a polymer-dispersed colorant dispersion. Polymer stabilized pigment dispersions have the additional advantage of offering image durability once the printed inks are dried down on a receiver element.

Polymeric dispersants, typically copolymers, are not limited in the arrangement of the monomers comprising the copolymer. The arrangement of monomers can be totally random, or they can be arranged in blocks such as AB or ABA wherein, A is the hydrophobic monomer and B is the hydrophilic monomer. In addition, the polymer can take the form of a random terpolymer or an ABC tri-block wherein, at least one of the A, B, and C blocks is chosen to be the hydrophilic monomer and the remaining blocks are hydrophobic blocks dissimilar from one another.

Especially useful copolymer dispersants are those where the hydrophobic monomer is selected from benzyl methacrylate or acrylate, or from methacrylic or acrylic acid esters containing an aliphatic chain having twelve or more carbons, which aliphatic chains can be linear or branched. Examples of methacrylic and acrylic acid esters having twelve or more carbons include but are not limited to, lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, and decyltetradecyl methacrylate. Particularly useful are stearyl or lauryl methacrylate or acrylate. The hydrophobic portion of the polymer can be prepared from one or more of the hydrophobic monomers.

Particularly useful copolymer dispersants are those where the hydrophilic monomer is selected from carboxylated monomers and are prepared from at least one hydrophilic monomer that is an acrylic acid or methacrylic acid monomer, or combinations thereof. Useful polymeric pigment dispersants are further described in U.S. Patent Application Publications 2006/0012654 (Wang et al.) and 2007/0043144 (House et al.), the disclosures of which are incorporated herein by reference.

Typically, the weight average molecular weight of a useful copolymer dispersant is less than 50,000 Daltons and can be even less than about 25,000 Daltons, and of at least 500 Daltons.

Encapsulating type polymeric dispersants and polymeric dispersed colorants thereof can also be used in the invention. Specific examples are described in U.S. Pat. No. 6,723,785 (Hama et al.) and U.S. Pat. No. 6,852,777 (Nakano et al.), U.S. Patent Application Publications 2004/0132942 (Sakakibara et al.), 2005/0020731 (Tanaka et al.), 2005/0075416 (Miyabayashi), 2005/0124726 (Yatake et al.), and 2005/0124728 (Komatsu et al.), the disclosures of which are incorporated herein by reference. Encapsulating type polymeric dispersants can be especially useful because of their high dispersion stability on keeping and low degree of interaction with composition components.

Self-dispersing colorants that are dispersible without the use of a dispersant or surfactant also can be used in the invention. Colorants of this type are those that have been subjected to a surface treatment such as oxidation/reduction, acid/base treatment, or functionalization through coupling chemistry. The surface treatment can render the surface of the colorant particles with anionic, cationic or non-ionic groups such that a separate dispersant is not necessary. The preparation and use of covalently functionalized self-dispersed colorants suitable for inkjet printing are described in U.S. Pat. No. 6,758,891 (Bergemann et al.) and U.S. Pat. No. 6,660,075 (Bergemann et al.), U.S. Pat. No. 5,554,739 (Belmont), U.S. Pat. No. 5,707,432 (Adams et al.), U.S. Pat. No. 5,803,959 (Johnson et al.), U.S. Pat. No. 5,922,118 (Johnson et al.), U.S. Pat. No. 5,837,045 (Johnson et al.), U.S. Pat. No. 6,494,943 (Yu et al.), U.S. Pat. No. 6,280,513 (Osumi et al.), U.S. Pat. No. 6,506,239 (Osumi et al.), U.S. Pat. No. 6,503,311 (Karl et al.), U.S. Pat. No. 6,852,156 (Yeh et al.), and U.S. Pat. No. 6,488,753 (Ito et al.), the disclosures of which are incorporated herein by reference, and in EP 1,479,732 A1 (Itoh et al.).

Also useful in the invention as colorants are polymeric dyes or loaded-dye/latex particles. Examples of polymeric dyes are described in U.S. Pat. No. 6,457,822 (Chen et al.) and references therein. Examples of loaded-dye/latex particles are described in U.S. Pat. No. 6,431,700 (Chen et al.), and U.S. Patent Application Publications 2004/0186199 (Wang et al.), 2004/0186198 (Potenza et al.), 2004/0068029 (Wang et al.), 2003/0119984 (Wang et al.), and 2003/0119938 (Wang et al.).

The aqueous ink jet ink composition of this invention can also comprise one or more polymer additives distinct from any dispersants used to disperse the colorants. The polymer additives can be water-soluble or water-dispersible and can comprise one or more water soluble copolymers, each having block segments or random segments comprised of styrene and acrylic monomers, and a molecular weight greater than 1,000. The water-soluble or water-dispersible polymer additives can have a weight average molecular weight ($M_w$) of at least 1,000 and up to and including 100,000 or typically of at least 1,000 and up to and including 50,000. Such water-soluble polymer additives can comprise one or more polystyrene or substituted polystyrene chains copolymerized with other acrylate or substituted acrylate monomers or attached to another species. In one embodiment, the water-soluble polymer additive can comprise a copolymer randomly derived from styrene, alpha-methylstyrene, acrylic acid, and tris-ethylenoxyacrylate, in various molar ratios of recurring units.

Other examples of useful polymer additives are described in U.S. Publication Patent Application 2001-0122180 (Cook et al.), the disclosure of which is incorporated herein by reference, which water-soluble polymer additives have random or block segments comprised of styrene and acrylic monomers and a weight average molecular weight greater than 1,000.

Still other useful polymer additives are described in U.S. Patent Application Publication 2011/0123714 (Yau et al.), the disclosure of which is incorporated herein by reference, which polymer additives are water-soluble block copolymers having one or more poly(ethylene oxide) block segments having a weight average molecular weight greater than 500.

Still other useful polymer additives are water-soluble acrylic polymers that are described for example in U.S. Patent Application Publication 2008/0207811 (Beast et al.), the disclosure of which is incorporated herein by reference.

The water-soluble or water-dispersible polymer additive can be present in the aqueous ink jet ink compositions of this invention in an amount effective to stabilize the composition against shear induced agglomeration caused by pumping the composition through a continuous ink jet printing fluid system, but not to substantially displace any dispersant used to disperse the colorants in the composition.

The concentration of the polymer additive is generally at least 0.05 weight % and up to and including 5 weight % or at least 0.1 weight % and up to and including 3 weight %, based on the total composition weight. For example, a styrene-acrylic copolymer additive can be present at a weight ratio of at least 1:10 and up to and including 1:2, and more likely of at least 1:6 and up to and including 1:3 relative to the dispersed colorant(s).

The aqueous ink jet ink composition of this invention desirably contains water as the principal aqueous medium, and besides the components described above, it can optionally include one or more humectants, biocides, and surfactants, film-forming binders or mordants, solubilizing agents, co-solvents, bases, acids, pH buffers, wetting agents, chelating agents, corrosion inhibitors, viscosity modifiers, penetrants, wetting agents, antifoamants, defoamers, antifungal agents, jetting aids, filament length modifiers, trace multivalent cationic flocculating salts, thickeners, conductivity enhancing agents, drying agents, waterfastness agents, dye solubilizers, chelating agents, binders, light stabilizers, viscosifiers, anti-curl agents, anti-corrosion agents, stabilizers, or solution conductivity control agents. Examples of all of these optional components and useful amounts are known in the art.

For example, any water-soluble humectant known in the ink jet art that is compatible with the other requirements of the invention can be used. By water-soluble is meant that a mixture of the employed humectant(s) and water is homogeneous. While an individual humectant can be employed, useful compositions of this invention contain two or more humectants, each of which imparts a useful property to the composition. A useful humectant is generally a water-miscible organic solvent having a viscosity greater than 40 centipoise (cps), or greater than 100 centipoise (cps) at a temperature of 25° C.

Representative examples of humectants and co-solvents useful in the compositions of this invention include but are not limited to:

(1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol, (2) polyhydric alcohols, such as ethylene glycol, diethylene glycol, triethylene glycol, tetraethylene glycol, glycerol, propylene glycol, dipropyleneglycol, 1,2,6-hexanetriol, 2-ethyl-2-hydroxymethyl-propane diol, trimethyloipropane, alkoxylated triols, alkoxylated pentaerythritol, saccharides, sugar alcohols, the polyethylene glycols with average molecular weights of at least 200 and up to and including 5000 Daltons, the polypropylene glycols with average molecular weights of at least 200 and up to and including 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexane diol, 2,2,4-dimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols and thioglycol, (3) polyoxygenated polyols and their derivatives such as diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives, (4) nitrogen-containing compounds such as urea, 2-pyrrolidinone, N-methyl-2-pyrrolidinone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone, (5) sulfur-containing compounds such as 2,2'-thiodiethanol, dimethyl sulfoxide and tetramethylene sulfone, and (6) water soluble N-oxides such as 4-methylmorpholine-N-oxides.

Of these compounds, glycerol and the polyhydric alcohol derivatives thereof are particularly useful. The polyhydric alcohol derivatives of glycerol include the glycerol ethoxides, glycerol propoxides, and glyceryths. The humectant can be employed alone or in combination with one or more additional listed humectants. The useful humectants have melting points below the typical operating temperature of the intended printer system to avoid the formation of crystalline deposits on the print head or in the maintenance system. Practically, this means that the useful humectants have melting points below 30° C. or even below 20° C.

The total humectant level in the aqueous ink jet ink composition of the present invention is desirably at least 0.1 weight % and up to and including 30 weight %, or typically at least 4 weight % and up to and including 25 weight % based on the total composition weight. The total humectant amount in the composition is the sum of the individual sources of humectant ingredients, which can include humectants added directly during composition formulation, and humectants associated with a commercial biocide preparation as a supplemental ingredient, or with any other commercial component added to the composition.

The ink jet ink composition of this invention can also include one or more water-miscible co-solvents or penetrants with a humectant. Representative co-solvents include but are not limited to (1) alcohols such as methyl alcohol, ethyl alcohol, n-propyl alcohol, isopropyl alcohol, n-butyl alcohol, furfuryl alcohol, and tetrahydrofurfuryl alcohol, (2) lower mono- and dialkyl ethers derived from polyhydric alcohols such as ethylene glycol monomethyl ether, ethylene glycol monobutyl ether, ethylene glycol monoethyl ether acetate, diethylene glycol monomethyl ether, and diethylene glycol monobutyl ether acetate, (3) nitrogen-containing compounds such as urea, 2-pyrrolidinone, N-methyl-2-pyrrolidinone, and 1,3-dimethyl-2-imidazolidinone, and (4) sulfur-containing compounds such as 2,2'-thiodiethanol, dimethyl sulfoxide, and tetramethylene sulfone. One or more co-solvents can be present in an amount of at least 2 weight % and up to and including 20 weight %, based on the total composition weight.

The pH of the aqueous ink jet ink compositions of this invention can be adjusted by the addition of organic or inorganic acids or bases. The pH of the composition can be desirably adjusted to at least 4 and up to and including 12 or more likely at least 4 and up to and including 10. An anticorrosion inhibitor such as the sodium salt of 4- or 5-methyl-1-H-benzotriazole is desirably added and the pH adjusted to be at least 10 and up to and including 11. When the composition is used with print heads having components fabricated from silicon that are in contact with the composition, the composition pH is desirably adjusted to be at least 7 and up to and including 9.5 or at least 7.5 and up to and including 9. In order to minimize the risk of excessively protonating carboxylate anions associated with polymeric dispersants and anionic charge stabilized anti-abrasion polymers that might render the composition more susceptible to flocculation, pH levels lower than 7 are usually avoided. With hardware components fabricated from silicon in contact with the composition, pH levels of at least 10 can induce significant rates of etch and corrosion that can impair the operation of the device over time. Typical useful inorganic acids include but are not limited to, nitric acid, hydrochloric acid, phosphoric acid, and sulfuric acids. Typical useful organic acids include but are not limited to, methanesulfonic acid, acetic acid, formic acid, and lactic acid. Typical useful inorganic bases include but are not limited to, alkali metal hydroxides and carbonates. Typical useful organic bases include but are not limited to, ammonia, triethanolamine, and tetramethyl-ethylenediamine. Amine bases especially useful include 3-amino-1-propanol, N,N-dimethanolamine, N,N-dimethylethanolamine, N,N-diethylethanolamine, and triethanolamine. The known Goods buffers can also be employed. The amount of useful acid, base, or buffer to be used in the composition of this invention would be readily apparent to one skilled in the art.

Control of etching or corrosion of print heads can achieved using certain metal salts, including but not limited to aluminum salts or metal oxide particles, as described for example in U.S. Pat. No. 8,348,411 (Brust et al.) the disclosure of which is incorporated herein by reference.

In some embodiments, the composition of this invention can also comprise an acidic salt of an organic amine and additional free organic amine, as described for example in U.S. Patent Application Publication 2010/0304028 (Sowinski et al.), the disclosure of which is incorporated herein by reference. The incorporation of the acidic salt of an organic amine and additional free organic amine can provide buffering at a pH of at least 8 and a resistivity of the composition of less than 700 ohm-cm at 25° C. The ratio of equivalents of organic amine to equivalents of acid used to form the acidic salt of the organic amine is generally at least 1.1:1. This control of the composition resistivity can be useful when the aqueous ink jet printer ink is recycled from a main fluid supply and using an ink jet printer having a composition delivery system that is capable of measuring composition conductivity as a means for determining when additional supply of composition (replenisher composition or fresh composition) is to be added to the main fluid supply to maintain desired recycled composition concentration. The electrical conductivity of the composition can be measured by applying an electrical potential across two electrodes immersed in the composition and using Ohm's law. Further details are provided in the cited U.S. Patent Application Publication 2010/0304028 (noted above).

The aqueous ink jet ink compositions of the invention can contain surfactants adjust the static surface tension or dynamic surface tension of the composition to an appropriate level. Useful surfactants can be anionic, cationic, amphoteric, or nonionic in nature and used at amounts of at least 0.01 weight % and up to and including 5 weight % based on the total weight of the composition. Representative surfactants are described for example in U.S. Pat. No. 8,187,371 (noted above) and U.S. Patent Application Publication 2008/0207811 (noted above), the disclosures of which are incorporated herein by reference.

Defoaming agents comprised of phosphate esters, polysiloxanes, or acetylenic diols can also be included in the compositions of this invention to minimize foam formation caused by the fluid agitation associated with drop catching and composition recirculation.

A biocide can be included in the composition of this invention to suppress the growth of microorganisms such as molds and fungi. A useful biocide is commercially available as Proxer GXL (Zeneca Specialties Co.) or Kordek® (Rohm and Haas), and this or another biocide can be included at a final concentration of at least 0.0001 weight % and up to and including 1 weight % based on the total composition weight.

The exact choice of essential components (visible or invisible colorant, polymeric agent, and water) and optional components (described above) in the composition of this invention will depend upon the specific application and performance requirements of the ink jet print head from which the composition is to be jetted. For some embodiments of continuous ink jet ejection mode, acceptable composition viscosities are at least 0.9 cps (centipoises) and up to and including 10 cps, or typically at least 0.9 cps and up to and including 5 cps, as measured at 25° C. using a capillary viscometer.

In many embodiments of this invention, the composition has a resistivity of less than 700 ohm-cm as determined by measuring composition conductivity using a conductivity meter, and then converting the conductivity to resistivity using known mathematical relationships.

The compositions of the present invention can be printed through an ink jet print head, for example, that is capable of achieving firing frequencies of at least 12 kHz with a near nozzle velocity of at least 10 meters/second. Any of the known print head designs in the art of ink jet printing can be used that are capable of achieving these high speed firing frequencies. For example, the ink jet printer can be equipped with a thermal ink jet print head such as those described in U.S. Patent Application Publications 2006/0103691 (Dietl et al.) and 2008/0136867 (Lebens et al.), the disclosures of which are incorporated herein by reference.

An illustration of a suitable ink jet printing system in which the composition of the present invention can be used are shown in U.S. Pat. No. 8,192,008 (noted above) and U.S. Patent Application Publication 2012/0050380 (noted above), the disclosures of which is incorporated herein by reference. Various DOD liquid emission devices have been known as ink jet printing devices for many years and are described for example in the noted patent (Col. 18).

Some embodiments of the aqueous ink jet ink compositions of the present invention are designed specifically for use in a continuous ink jet printer, in which a main fluid supply is provided with a desired amount of the composition, which is then pumped from the main fluid supply to a drop generator mechanism such as one or more ink jet print heads, where a continuous stream of the composition is ejected from the drop generator mechanism, which continuous stream then is broken into spaced drops.

In response to electrical signals received from a suitable control mechanism, the spaced drops are then selected or controlled between printing drops for marking a receiver element and non-printing drops that are collected and returned to the main fluid supply. For example, the printing drops and non-printing drops can be differentiated by drop size. Some of the details of these actions are described more fully for example in U.S. Pat. No. 4,734,711 (Piatt et al.), U.S. Pat. No. 5,394,177 (McCann et al.), U.S. Pat. No. 6,588,888 (noted above), U.S. Pat. No. 6,943,037 (noted above), U.S. Pat. No. 4,614,948 (Katerberg et al.), and U.S. Pat. No. 4,971,527 (Dick), and EP 1,013,450 (Enz et al.), the disclosures of which are incorporated by reference herein. In contrast to drop-on-demand printing, CIJ is a very high speed printing process and it is desired to operate at substrate transport speeds in excess of 20 m/min. Printing speed alone imposes some limitations on composition formulation relative to slower drop-on-demand printing techniques, simply on the basis of the short time requirements for adequately drying the printed receiver element moving at full speed in the printing press before roll wind-up. Composition formulation considerations specific to CIJ printing are described in W. Wnek, IEEE Trans. 1986, 1475-81, which describes the composition performance requirements for drop formation, deflection, and catching of non-printing drops, recirculation of the composition to the drip generator mechanism from the main fluid supply for future printing, and also for commercial image quality and durability.

Other CIJ printing devices are described in U.S. Pat. No. 6,554,410 (Jeanmaire et al.), U.S. Pat. No. 6,682,182 (Jeanmaire et al.), U.S. Pat. No. 6,793,328 (Jeanmaire), U.S. Pat. No. 6,866,370 (Jeanmaire), U.S. Pat. No. 6,575,566 (Jeanmaire et al.), and U.S. Pat. No. 6,517,197 (Hawkins et al.), the disclosures of which are incorporated herein by reference.

One sub-system common to most CIJ apparatus and methods and to some of the more recent DOD printing systems, is a recirculating fluid system, which constantly recirculates the ink. For these types of ink jet printing systems the median particle size of the colorants and the overall stability of the pigment particle dispersion, are critical features due the potentially abrasive nature of pigment particle dispersions. Larger particles or less stable particle dispersions are more prone to cause premature wear or failure of the components of the ink jet printing system and fluid sub-system.

In some embodiment of the present invention, the aqueous ink jet ink composition is printed by employing a plurality of drop volumes (or drop size) formed from the continuous fluid stream, with non-printing drops of a different volume than printing drops being diverted by a drop deflection means into a gutter for recirculation, as disclosed for example in U.S. Pat. No. 6,588,888 (noted above), U.S. Pat. No. 6,554,410 (noted above), U.S. Pat. No. 6,682,182 (noted above), U.S. Pat. No. 6,793,328 (noted above), U.S. Pat. No. 6,517,197 (noted above), U.S. Pat. No. 6,866,370 (noted above), and U.S. Pat. No. 6,575,566 (noted above), U.S. Patent Application Publication 2003/0202054 (Jeanmaire et al.) the disclosure of which is herein incorporated by reference.

In another embodiment, the aqueous ink jet ink composition is printed onto a receiver element using an apparatus capable of controlling the direction of the formed printing and non-printing drops by asymmetric application of heat to the continuous stream of the composition that initializes drop break-up and serves to steer the resultant drops, as disclosed for example in U.S. Pat. No. 6,079,821 (Chwalek et al.) and U.S. Pat. No. 6,505,921 (Chwalek et al.), the disclosures of which are herein incorporated by reference. Useful agitation of the composition, heated main fluid supply, and ink jet print heads and composition filtration means for CIJ ink compositions are described for example in U.S. Pat. No. 6,817,705 (Crockett et al.), the disclosure of which is incorporated herein by reference. Printer replenishing systems for maintaining quality of the composition and countering the effects of volatile component evaporation are described in U.S. Pat. No. 5,526,026 (Bowers) and U.S. Pat. No. 5,473,350 (Mader et al.), the disclosures of which are incorporated herein by reference, and in EP 0 597 628 A1 (Loyd et al.).

It can be useful to regularly replenish the main fluid supply with additional aqueous ink jet ink composition of this invention to keep the reservoir at the desired level during ink jet printing. Alternatively, water can be added to the main fluid supply to compensate for water that is evaporated during ink jet printing. A skilled worker in the art would understand how to accomplish these operations using the teaching provided in the art noted above.

The present invention can be used to provide continuous ink jet printer images with desired amount of colorants, so the image is suitably detectable using appropriate means (described below), on a variety of substrates or receiver elements, including but not limited to, the normal mix of paper substrates such as plain bond papers, ink jet papers, surface-treated papers, coated or calendared business gloss papers, microporous photoglossy papers, resin-coated papers, laminated substrates comprising both paper layers and polymeric film layers such as polyester, polypropylene or polyethylene film layers, and heavy stock papers. It is also possible to "print" the composition of this invention on fabrics, cardboard, plastic films (such as polyester films), microporous materials, and any other receiver element material on which a colored or colorless image is desired. The receiver element can be transparent, translucent, or opaque, swellable or non-swellable, or porous or nonporous, or any combination of these features.

In some embodiments, useful receiver elements that can be marked with a visible or invisible image according to this invention using the aqueous ink jet ink composition of this invention include but are not limited to, papers used for computer printers, newsprint, currency, passports and other identification papers, bonds and other security instruments, glass, rubber, vinyl plastics, fabrics, metals, and woods.

The durability and other properties of a printed ink jet image according to this invention can be improved by using receiver elements that have been pretreated with a composition to enhance the quality of ink jet printed image. This pretreatment is typically done prior to incorporation of the receiver element into the ink jet printing apparatus (such as a continuous ink jet printing apparatus), but in some instances, the receiver element could be pretreated within the apparatus before application of the composition of this invention. One or both sides of a receiver element can be pretreated, or one side can be pretreated and the opposite surface left untreated.

For example, the receiver element can be pretreated to form a "pretreated receiver element" by application of an overcoat (usually colorless), for example as described in U.S. Pat. No. 7,219,989 (Uerz et al.), the disclosure of which is incorporated herein by reference. In order to achieve higher print speeds and throughput, a pretreatment of overcoat composition can be applied using a continuous ink jet print head following in-line with one or more drop generator mechanisms (print head) that applies (prints) the composition of the present invention, with or without application of additional ink jet ink compositions of this invention. Thus, the ink jet printer apparatus can comprise multiple ink jet print heads, some of which provide the ink jet printed image according to the present invention and still others that pretreat the receiver elements.

The drop size, addressability, and printed resolution of an overcoat composition are not required to be the same as the printed ink jet compositions, and differing continuous inkjet print head technologies can be used as long as desired receiver element transport speeds are achieved. The overcoat composition can further comprise an acidic organic amine salt and an organic amine that are present in concentrations and in relative proportion to provide a buffered pH of at least 8 and a resistivity less than 700 ohm-cm, for example as described above for the aqueous inkjet ink composition of this invention.

In addition, a receiver element can be pretreated with a pretreatment composition comprising a water-soluble multivalent metal ion salt, such as but not limited to, salt comprising one or more multivalent cations including calcium, magnesium, barium, zinc, and aluminum cations, with calcium and magnesium cations being particularly useful. Examples of useful multivalent metal ion salts include but are not limited to, calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Other useful salts could be determined by a skilled artisan, and one or more of such multivalent metal ion salts can be used in the pretreatment composition in an amount that would be readily apparent to one skilled in the art.

Such pretreatment compositions can also comprise a cationic polyelectrolyte comprising amidine moieties, and the details of such compounds and their useful amounts are provided in copending and commonly assigned U.S. patent application Ser. No. 13/433,412 (filed Mar. 29, 2012 by Xiang and Botros), the disclosure of which is incorporated herein by reference.

Besides applying the pretreatment composition using an ink jet printer apparatus (such as a continuous ink jet printer apparatus), it can also be applied using other mechanical techniques including but not limited to, rod coating, blade coating, gravure coating, flexographic printing, extrusion hopper coating, curtain coating, and spray coating. After the pretreatment composition is dried, the pretreated receiver element can be calendered to improve gloss.

Once the aqueous ink jet ink composition of this invention has been applied (printed) onto a suitable receiver element, the receiver element is then imaged using the composition of this invention.

The printed receiver element can be a suitable article, including but not limited to, newsprint, ink jet printer papers, documents, paper currency, postage stamps, packaging, fabrics, polymeric films or sheets, labels for clothing, perfume or wine bottles, lottery tickets, passports, drivers licenses, and other articles mentioned above in the Background of the Invention or which would be readily apparent to one skilled in the art using the teaching provided herein.

The present invention provides at least the following embodiments and combinations thereof, but other combinations of features are considered to be within the present invention as a skilled artisan would appreciate from the teaching of this disclosure:

1. An aqueous ink jet ink composition comprising:
a visible or invisible colorant, and
a polymeric agent comprising core-shell polymeric particles, wherein the core of the core-shell polymeric particles comprises a hydrophobic polymer having an acid number less than 10, and the shell of the core-shell polymeric particles comprises a hydrophilic polymer having an acid number of at least 70, and the weight ratio of the core to the shell is at least 50:50 and up to and including 90:10.

2. An aqueous ink jet ink composition comprising:
a polymeric agent comprising core-shell polymeric particles that is present in an amount of at least 0.5 weight % and up to and including 10 weight %,
wherein the core of the core-shell polymeric particles comprises a hydrophobic polymer having an acid number less than 10, and the shell of the core-shell polymeric particles comprises a hydrophilic polymer having an acid number of at least 70, and the weight ratio of the core to the shell is at least 50:50 and up to and including 90:10.

3. The aqueous ink jet ink composition of any of embodiment 1 or 2, wherein the core of the core-shell polymeric particles comprises a hydrophobic polymer having an acid number of 0 and up to and including 5, the shell of the core-shell polymeric particles comprises a hydrophilic polymer having an acid number of at least 100, and the weight ratio of the core to the shell is at least 50:50 and up to and including 70:30.

4. The aqueous ink jet ink composition of any of embodiments 1 to 3, wherein the core of the core-shell polymeric particles comprises a polyurethane or polyacrylate, and has an acid number of less than 5.

5. The aqueous ink jet ink composition of any of embodiments 1 to 4, wherein the shell of the core-shell polymeric particles comprises a water-soluble or water-dispersible polyurethane, and has an acid number of at least 100 as provided by acidic groups.

6. The aqueous ink jet ink composition of any of embodiments 1 and 3-5, wherein the colorant is a visible non-fluorescing colorant.

7. The aqueous ink jet ink composition of any of embodiments 1 and 3 to 5, wherein the colorant is a visible or invisible fluorescing colorant.

8. The aqueous ink jet ink composition of any of embodiments 1 and 3 to 7, wherein the colorant is a pigment having a median particle size that is greater than 10 nm and up to and including 500 nm, and the $95^{th}$ percentile colorant pigment particle size is less than 250 nm.

9. The aqueous ink jet ink composition of any of embodiments 1 and 3 to 7, wherein the colorant is a pigment having a median particle size that is greater than 5 nm and up to and including 250 nm.

10. The aqueous ink jet ink composition of any of embodiments 1 to 9, wherein the polymeric agent is present in an amount of at least 0.1 weight % and up to and including 20 weight %.

11 The aqueous ink jet ink composition of any of embodiments 10, further comprising a dispersing agent for any visible or invisible colorant that is present.

12. The aqueous ink jet ink composition of any of embodiments 1 to 11, further comprising a humectant.

13. The aqueous ink jet ink composition of any of embodiments 1 to 12, wherein the shell of the core-shell particles is composed of a polyurethane and the core of the core-shell particles is composed of a polyurethane, 14. A method of ink jet printing, comprising:
providing the aqueous ink jet ink composition of any of embodiments 1 to 13,
delivering the aqueous ink jet ink composition to a drop generator mechanism, and ejecting the aqueous ink jet printer ink composition from the drop generator mechanism, and controlling the spaced drops to image a receiver element.

15. The method of embodiment 14, wherein the ink jet ink composition is provided from a main fluid supply, and the continuous stream is broken into both spaced drops and non-printing drops that are collected and returned to a main fluid supply.

16. The method of embodiment 14 or 15, wherein the drop generating mechanism comprises one or more print heads.

17. The method of any of embodiments 14 to 16, wherein the receiver element has been pretreated with a composition to enhance the quality of the ink jet printed image.

18. The method of any of embodiments 14 to 17 that is carried out using continuous ink jet printing.

19. The method of any of embodiments 14 to 17 that is carried out using drop on demand ink jet printing.

20. A method for forming an image, the method comprising ink jet printing a receiver element with the aqueous ink jet ink composition of any of embodiments 1 to 13, using an ink jet printer.

21. A receiver element that has been imaged according to the method of any of embodiments 14 to 20, and having thereon an ink jet printed image comprising a polymeric agent comprising core-shell polymeric particles.

22. The receiver element of embodiment 21 that has been pretreated receiver element with a composition to enhance the quality of the ink jet printed image.

The following Preparations and Examples are provided to illustrate the practice of this invention and are not meant to be limiting in any manner.

Preparation of Known Aqueous Compatible Polyurethanes:

PU-1: A polyurethane was made by polymerizing 39 weight % of isophorone diisocyanate 24 weight % of 2,2-bis (hydroxymethyl) propionic acid (DMPA), and 37 weight % of a 2,000 $M_w$ polytetrahydrofuran polyol in tetrahydrofuran (THF) at 75° C. This temperature was maintained until the reaction was complete, resulting in an intermediate containing no residual free isocyanate. The free isocyanate content was monitored by the disappearance of the NCO absorption peak by infrared spectroscopy. A 95% stoichiometric neutralization of the carboxylic acid was carried out using a potassium hydroxide solution, followed by the addition of distilled water under blade type low shear mixing conditions to form a stable aqueous dispersion of about 25% solids. The THF was removed by heating under vacuum and the resultant aqueous dispersion was filtered. The resulting polyurethane had an $M_w$ of about 20,000 as determined by size exclusion chromatography (SEC) and an acid number of 100 that was determined as described above.

PU-2: A polyurethane was made by polymerizing 25 weight % of isophorone diisocyanate, 12 weight % of 2,2-bis (hydroxymethyl) propionic acid (DMPA), and 65 weight % of a 2,000 $M_w$ polytetrahydrofuran polyol in tetrahydrofuran (THF) at 75° C. The procedure used to make PU-1 was followed. The resulting polyurethane had an $M_w$ of about 26,000 as determined by SEC and an acid number of 50 that was determined as described above.

PU-3: A polyurethane was made by polymerizing 22 weight % of isophorone diisocyanate, 10 weight % of 2,2-bis (hydroxymethyl) propionic acid (DMPA), and 68 weight % of a 2,000 $M_w$, polytetrahydrofuran polyol in tetrahydrofuran (THF) at 75° C. The procedure used to make PU-1 was followed. The resulting polyurethane had an $M_w$ of about 39,600 as determined by SEC and an acid number of 40 that was determined as described above.

PU-4: A polyurethane was made by polymerizing 19 weight % isophorone diisocyanate, 7 weight % 2,2-bis(hydroxymethyl) propionic acid (DMPA), and 74 weight % of a 2,000 $M_w$ polytetrahydrofuran polyol in tetrahydrofuran (THF) at 75° C. The procedure used to make PU-1 was followed. The resulting polyurethane had an $M_w$ of about 33,900 as determined by SEC and an acid number of 30 that was determined as described above.

PU-5: A polyurethane was made by polymerizing 16 weight % of isophorone diisocyanate, 5 weight % of 2,2-bis (hydroxymethyl) propionic acid (DMPA), and 79 weight % of a 2,000 $M_w$ polytetrahydrofuran polyol in tetrahydrofuran (THF) at 75° C. The procedure used to make PU-1 was followed. The resulting polyurethane had an $M_w$ of about 31,600 as determined by SEC and an acid number of 20 that was determined as described above.

PU-6 A polyurethane was made by polymerizing, 25 weight % of isophorone diisocyanate, 12 weight % of 2,2-bis (hydroxymethyl) propionic acid (DMPA), and 63 weight % of a 2,000 $M_w$ polycarbonate polyol in tetrahydrofuran (THF) at 75° C. The procedure to make PU-1 was followed. The resulting polyurethane had an $M_w$ of about 24,300 as determined by SEC and an acid number of 50 that was determined as described above.

Preparation of Aqueous Core-Shell Polymeric Particles:

PU-7: 50 weight % of a 0 acid number polyether polyurethane (core) of 15.5k $M_w$ dissolved in THF was combined with 50 weight % 100 acid number polyether polyurethane (shell) of 24,400 $M_w$ dissolved in THF. A water solution of potassium hydroxide was then added to neutralize 100% of the carboxylic acid groups under blade-type low shear mixing conditions followed by additional distilled water resulting in an aqueous dispersion of 25% solids. The THF was stripped under vacuum and the dispersion filtered. The resulting core-shell mean particle size was 1.4 µm as measured by light scattering.

PU-8: 60 weight % of a 0 acid number polyether polyurethane (core) of 15,500 $M_w$ dissolved in THF was combined with 40 weight % of an 100 acid number polyether polyurethane (shell) of 24,400 $M_w$ dissolved in THF. The procedure used for PU-7 was followed. The resulting core-shell mean particle size was 1.4 µm as measured by light scattering.

PU-9: 70 weight % of a 0 acid number polyether polyurethane (core) of 16,200 $M_w$ dissolved in THF was combined with 30 weight % of a 100 acid number polyether polyurethane (shell) of 24,400 $M_w$ dissolved in THF. The procedure used for PU-7 was followed. The resulting core-shell mean particle size was 5.6 µm as measured by light scattering.

PU-10 50 weight % of a 0 acid number 16,400 $M_w$ polyether polyurethane (core) containing 10 weight % of 15,000 $M_w$ pendant PDMS (polydimethylsiloxane) chains along with 3 weight % of 1,000 $M_w$ amine terminated PDMS dissolved in THF was combined with 50 weight % of a 100 acid number polyether polyurethane (shell) of 20,700 $M_w$ dissolved in THF. The procedure used for PU-7 was follows. The resulting core-shell mean particle size was 1.9 µm as measured by light scattering.

PU-11 60 weight % of a 0 acid number 16.4 k $M_w$ polyether polyurethane (core) containing 10 weight % of 15,000 $M_w$ pendant PDMS chains along with 3 weight % of 1,000 $M_w$ amine terminated PDMS dissolved in THF was combined with 40 weight % a 100 acid number polyether polyurethane (shell) of 20,700 $M_w$ dissolved in THF. The procedure used for PU-7 was followed. The resulting core-shell mean particle size was 2.3 µm as measured by light scattering.

PU-12 70 weight % of a 0 acid number 16,400 $M_w$ polyether polyurethane (core) containing 10 weight % of 15,000 $M_w$ pendant PDMS chains along with 3 weight % of 1,000 $M_w$ amine terminated PDMS dissolved in THF was combined with 30 weight % of a 100 acid number polyether polyurethane (shell) of 20,700 $M_w$ dissolved in THF. The procedure used for PU-7 was followed. The resulting core-shell mean particle size was 3.5 µm as measured by light scattering.

PU-13: 80 weight % of a 0 acid number 16,400 $M_w$ polyether polyurethane (core) containing 10 weight % of 15,000 $M_w$ pendant PDMS chains along with 3 weight % of 1,000 $M_w$ amine terminated PDMS dissolved in THF was combined with 20 weight % of a 100 acid number polyether polyurethane (shell) of 20,700 $M_w$ dissolved in THF. The procedure used for PU-7 was followed. The resulting core-shell mean particle size was 7.4 µm as measured by light scattering.

PU-14: 50 weight % of a 0 acid number polyether polyurethane (core) of 16,200 $M_w$ dissolved in THF was combined with 50 weight % a 100 acid number polyether polyurethane (shell) of 19,400 $M_w$ dissolved in THF. A water solution of potassium hydroxide was then added to neutralize 100% of the carboxylic acid groups followed with additional distilled water resulting in an aqueous dispersion of 25% solids under blade-type low shear mixing conditions. The dispersion was then passed three times through a microfluidizing device operating between 7,000-10,000 psi. The THF was stripped under vacuum and the dispersion filtered. The resulting core-shell mean particle size was 0.10 µm as measured by light scattering.

PU-15: 50 weight % of a 0 acid number polycarbonate polyurethane (core) of 13,800 $M_w$ dissolved in THF was combined with 50 weight % of a 100 acid number polyether polyurethane (shell) of 19.4k $M_w$ dissolved in THF. The procedure used for PU-7 was followed. The resulting core-shell mean particle size was 2.76 µm as measured by light scattering.

PU-16: 50 weight % of a 0 acid number polycarbonate polyurethane (core) of 13,800 $M_w$ dissolved in THF was combined with 50 weight % a 100 acid number polyether polyurethane (shell) of 19,400$M_w$ dissolved in THF. A water solution of potassium hydroxide was then added to neutralize 100% of the carboxylic acid groups followed with additional distilled water resulting in an aqueous dispersion of 25% solids under blade-type low shear mixing conditions. The dispersion was then passed three times through a high shear Gaulin mill operating at 3000 psi per pass. The THF was stripped under vacuum and the dispersion was filtered. The resulting core-shell mean particle size was 0.69 µm as measured by light scattering.

PU-17: 50 weight % of a 0 acid number 16,500 $M_w$ polyether polyurethane (core) containing 10 weight % of 15,000 Mw pendant PDMS chains along with 3 weight % of 1,000 $M_w$ amine terminated PDMS dissolved in THF was combined with 50 weight % of a 100 acid number polyether polyurethane (shell) of 19,400 $M_w$ dissolved in THF. The procedure used for PU-7 was followed. The resulting core-shell mean particle size was 0.52 µm as measured by light scattering.

PU-18: 50 weight % of a 0 acid number 16,400 $M_w$ polyether polyurethane (core) containing 10 weight % of 15,000 Mw pendant PDMS chains along with 3 weight % of 1,000 $M_w$ amine terminated PDMS dissolved in THF was combined with 50 weight % of a 100 acid number polyether polyurethane (shell) of 19,400 $M_w$ dissolved in THF. A water solution of potassium hydroxide was then added to neutralize 100% of the carboxylic acid groups followed with additional distilled water resulting in an aqueous dispersion of 25% solids under blade-type low shear mixing conditions. The dispersion was then passed 3 times through a high shear Gaulin mill operating at 3,000 psi per pass. The THF was stripped under vacuum and dispersion was filtered. The resulting core-shell mean particle size was 0.15 µm as measured by light scattering.

PU-19: 50 weight % of a 0 acid number polyether polyurethane (core) of 16,400 $M_w$ dissolved in THF was combined with 50 weight % of a 100 acid number polyether polyurethane (shell) of 20,700 $M_w$ dissolved in THF. The procedure used for PU-18 was followed. The resulting core-shell mean particle size was 0.10 μm as measured by light scattering.

PU-20: 50 weight % of a 0 acid number polyether polyurethane (core) of 16,400 $M_w$ dissolved in THF was combined with 50 weight % of a 100 acid number polyether polyurethane (shell) of 20,700 $M_w$ dissolved in THF. A water solution of potassium hydroxide was then added to neutralize 100% of the carboxylic acid groups followed by addition of 0.50 weight % of a water soluble acrylic polymer made by polymerizing 37 weight % of benzyl methacrylate, 30 weight % of n-octadecyl methacrylate, and 33 weight % of methacrylic acid, was added as an dispersing aid. Additional distilled water was added resulting in an aqueous dispersion of 25% solids under blade-type low shear mixing conditions. The THF was stripped under vacuum and the dispersion was filtered. The resulting core-shell mean particle size was 1.45 μm as measured by light scattering.

PU-21: 50 weight % of a 0 acid number polyether polyurethane (core) of 16,400 $M_w$ dissolved in THF was combined with 50 weight % of a 100 acid number polyether polyurethane (shell) of 20,700 $M_w$ dissolved in THF. A water solution of potassium hydroxide was then added to neutralize 100% of the carboxylic acid groups followed with 0.50 weight % of a water soluble acrylic polymer polymerized from 37 weight % of benzyl methacrylate, 30 weight % of n-octadecyl methacrylate, and 33 weight % of methacrylic acid, was added as a dispersing aid. Additional distilled water was added resulting in an aqueous dispersion of 25% solids under blade-type low shear mixing conditions. The dispersion was then passed one time through a high shear Gaulin mill operating at 3000 psi. The THF was stripped under vacuum and the dispersion was filtered. The resulting core-shell mean particle size was 0.19 μm as measured by light scattering.

PU-22: 50 weight % of a 0 acid number polyether polyurethane (core) of 16,400 $M_w$ dissolved in THF was combined with 50 weight % of a 100 acid number polyether polyurethane (shell) of 20,900 $M_w$ dissolved in THF. A water solution of potassium hydroxide was then added to neutralize 100% of the carboxylic acid groups followed with additional distilled water, resulting in an aqueous dispersion of 25% solids while under high-shear rotor stator mixing conditions. The THF was stripped under vacuum and the dispersion was filtered. The resulting core-shell mean particle size was 0.18 μm as measured by light scattering.

PU-23: 50 weight % of a 0 acid number 16,400 $M_w$ polyether polyurethane (core) containing 10 weight % of 15,000 $M_w$ pendant PDMS chains along with 3 weight % of 1,000 $M_w$ amine terminated PDMS dissolved in THF was combined with 50 weight % of a 100 acid number polyether polyurethane (shell) of 20,900 $M_w$ dissolved in THF. A water solution of potassium hydroxide was then added to neutralize 100% of the carboxylic acid groups followed with additional distilled water resulting in an aqueous dispersion of 25% solids while under high-shear rotor stator mixing conditions. The THF was stripped under vacuum and the dispersion was filtered. The resulting core-shell mean particle size was 0.34 μm as measured by light scattering.

PU-24: 60 weight % of a 0 acid number 17,400 $M_w$ acrylic copolymer (core) polymerized using 50 weight % benzyl methacrylate and 50 weight % of stearyl methacrylate dissolved in THF, was combined with 40 weight % of a 100 acid number polyether polyurethane (shell) of 20,700 $M_w$ dissolved in THF. A water solution of potassium hydroxide was then added to neutralize 100% of the carboxylic acid groups followed by additional distilled water resulting in an aqueous dispersion of 36% solids under rotor-stator high shear mixing conditions. The THF was stripped under vacuum and the dispersion was filtered. The resulting core-shell mean particle size was 0.1 μm as measured by light scattering.

PU-25: 50 weight % of a 0 acid number polyether polyurethane (core) of 16,200 $M_w$ dissolved in THF was combined with 50 weight % of a 100 acid number polyether polyurethane (shell) of 19,400 $M_w$ dissolved in THF. A water solution of potassium hydroxide was then added to neutralize 100% of the carboxylic acid groups followed with additional distilled water resulting in an aqueous dispersion of 32% solids while under low-shear mixing conditions. The THF was stripped under vacuum and the dispersion was filtered. The resulting core-shell mean particle size was about 4.1 μm as measured by light scattering.

PU-26: This dispersion was prepared identically to PU-25 except that it was passed through a high shear microfluidizer after the THF was stripped. The resulting core-shell mean particle size was 2.4 μm as measured by light scattering.

PU-27: 50 weight % of a 0 acid number 17,400 $M_w$ acrylic copolymer (core) obtained by polymerizing 50 weight % of benzyl methacrylate and 50 weight % of stearyl methacrylate dissolved in THF, was combined with 50 weight % of a 100 acid number polyether polyurethane (shell) of 20,700 $M_w$ dissolved in THF. A water solution of potassium hydroxide was then added to neutralize 100% of the carboxylic acid groups followed by additional distilled water resulting in an aqueous dispersion of 36% solids under rotor-stator high shear mixing conditions. The THF was stripped under vacuum and the dispersion was filtered. The resulting core-shell mean particle size was 0.1 μm as measured by light scattering.

PU-28: 70 weight % of a 0 acid number 17,400 $M_w$ acrylic copolymer (core) obtained by polymerizing 50 weight % benzyl methacrylate and 50 weight % of stearyl methacrylate dissolved in THF, was combined with 30 weight % of a 100 acid number polyether polyurethane (shell) of 20,700 $M_w$ dissolved in THF. A water solution of potassium hydroxide was then added to neutralize 100% of the carboxylic acid groups followed by additional distilled water resulting in an aqueous dispersion of 36% solids under rotor-stator high shear mixing conditions. The THF was stripped under vacuum and the dispersion was filtered. The resulting core-shell mean particle size was 0.1 μm as measured by light scattering.

PU-29: 50 weight % of a 0 acid number 17,500 $M_w$ acrylic copolymer (core) obtained by polymerizing 50 weight % of benzyl methacrylate and 50 weight % of stearyl methacrylate dissolved in THF, was combined with 50 weight % of a 100 acid number polyether polyurethane (shell) of 20,800 $M_w$ dissolved in THF. The procedure for PU-28 was followed to provide a dispersion of core-shell polymer particles. The resulting core-shell mean particle size was 0.11 μm as measured by light scattering.

PU-30: This core-shell polymer dispersion was prepared identically to PU-29, using the same core and shell polymers except that the core accounted for 60 weight % and the shell 40 weight % for an overall dispersion acid number of 40. The resulting core-shell mean particle size was 0.13 μm as measured by light scattering.

PU-31: This core-shell polymer dispersion was prepared identically to PU-29, using the same core and shell polymers except that the core accounted for 70 weight % and the shell 30 weight % for an overall dispersion acid number of 30. The resulting core-shell mean particle size was 0.14 tan as measured by light scattering.

PU-32 This core-shell polymer dispersion was prepared identically to PU-29, using the same core and shell polymers except that the core accounted for 80 weight % and the shell was 20 weight % for an overall dispersion acid number of 20. The resulting core-shell mean particle size was 0.17 μm as measured by light scattering.

PU-33: This core-shell polymer dispersion was prepared identically to PU-29, using the same batch of core and shell polymers except that the core accounted for 90 weight % and the shell 10 weight % for an overall dispersion acid number of 10. The resulting core-shell mean particle size was 0.21 μm as measured by light scattering.

Preparation of Ink Jet Ink Compositions for Polymer Evaluation

Magenta Pigment Dispersion M-1:

Dispersion M-1 was prepared with magenta pigment BASF-2BC (2:1 solid solution of PV19 and PR202) and an acrylic copolymer prepared from 37 weight % of benzyl methacrylate, 30 weight % of n-octadecyl methacrylate, and 33 weight % of methacrylic acid as the pigment dispersant. About 90% of the pigment dispersant acid groups were neutralized with potassium hydroxide.

Magenta Ink Compositions for Polyurethane Evaluation:

Into an approximately 125 ml high density polyethylene bottle with magnetic stirring, the following components were added, in order: high purity water, 0.02 weight % of the biocide Kordek® MLX, 5 weight % of glycerol, 10 weight % of 1-(2-hydroxyethyl)-2-pyrrolidinone, 3 weight % of 1,2-hexanediol, 0.5 weight % of Surfynol® 465 surfactant, 1 to 2 weight % of a polyurethane or combinations of polyurethane to produce dispersions having the characteristics and overall acid numbers as described below in TABLES Ia and Ib and 5 weight % of dispersion M-1. The resulting 120 g of ink jet ink composition were stirred for at least an hour and filtered using a 1.0 μm disk filter.

Jetting Results:

For evaluation, each ink jet ink composition was loaded directly into a thermal print head with 3 pL (picoliter) nozzles. At a voltage of 12% above the threshold voltage for the ink jet ink composition to begin firing, the transit time for each drop to travel 0.3 mm from the nozzle plate was measured for 250 drops at each of a set of varying firing frequencies from 0 to 25,000 Hz. The average velocity and the drop velocity expressed as the percent coefficient of variation of the velocity were calculated for 10 different nozzles fired under identical conditions.

TABLE Ia

| Composition | Dispersion | Polymer Type | Particle Size (μm) | Dispersion Acid Number |
|---|---|---|---|---|
| Comparative 1 | PU-1 | Homogeneous Polyurethane | N/A | 100 |
| Comparative 2 | PU-2 | Homogeneous polyurethane | N/A | 50 |
| Comparative 3 | PU-3 | Homogeneous polyurethane | N/A | 40 |
| Comparative 4 | PU-4 | Homogeneous polyurethane | N/A | 30 |
| Comparative 5 | PU-5 | Homogeneous polyurethane | N/A | 20 |
| Comparative - 6 | PU-6 | Homogeneous polyurethane | N/A | 50 |
| Comparative 7 | PU-1 and PU-5 | 20/100 Blend | N/A | 50 |
| Comparative 8 | PU-1 and PU-5 | 20/100 Blend | N/A | 40 |
| Comparative 9 | PU-1 and PU-5 | 20/100 Blend | N/A | 30 |
| Comparative 10 | PU-1 and PU-4 | 30/100 Blend | N/A | 40 |
| Comparative 11 | PU-1 and PU-4 | 30/100 Blend | N/A | 40 |
| Comparative 12 | PU-1 and PU-3 | 40/100 Blend | N/A | 50 |
| Invention 1 | PU-7 | Core-shell | 1.4 | 50 |
| Invention 2 | PU-8 | Core-shell | 1.4 | 40 |
| Invention 3 | PU-9 | Core-shell | 5.6 | 30 |
| Invention 4 | PU-10 | Core-shell | 1.9 | 50 |
| Invention 5 | PU-11 | Core-shell | 2.3 | 40 |
| Invention 6 | PU-12 | Core-shell | 3.5 | 30 |
| Invention 7 | PU-13 | Core-shell | 7.4 | 20 |
| Invention 8 | PU-14 | Core-Shell | 0.11 (median) | 50 |
| Invention 9 | PU-15 | Core-shell | 2.76 | 50 |
| Invention 10 | PU-16 | Core-shell | 0.69 | 50 |
| Invention 11 | PU-17 | Core-shell | 0.52 | 50 |
| Invention 12 | PU-18 | Core-shell | 0.15 | 50 |
| Invention 13 | PU-19 | Core-shell | 0.10 | 50 |
| Invention 14 | PU-20 | Core-shell | 1.45 | 50 |
| Invention 15 | PU-21 | Core-shell | 0.19 | 50 |
| Invention 16 | PU-22 | Core-shell | 0.18 | 50 |
| Invention 17 | PU-23 | Core-shell | 0.34 | 50 |
| Invention 18 | PU-24 | Core-shell | 0.10 | 50 |

TABLE Ib

| Composition | Dispersion | Core Polymer | Shell Polymer | Type of Mixing | Drop Velocity at 15 kHz | Drop Velocity Variation at 15 kHz as % COV |
|---|---|---|---|---|---|---|
| Comparative 1 | PU-1 | Polyether | None | None | 18.0 | 1.4 |
| Comparative 2 | PU-2 | Polyether | None | None | 4.8 | 11.2 |
| Comparative 3 | PU-3 | Polyether | None | None | 3.3 | 9.5 |
| Comparative 4 | PU-4 | Polyether | None | None | 4.2 | 8.6 |
| Comparative 5 | PU-5 | Polyether | None | None | 4.2 | 14.6 |
| Comparative 6 | PU-6 | Polycarbonate | None | None | 4.3 | 9.2 |
| Comparative 7 | PU-1 and PU-5 | Polyether | None | None | 4.2 | 9.1 |
| Comparative 8 | PU-1 and PU-5 | Polyether | None | None | 3.9 | 9.9 |
| Comparative 9 | PU-1 and PU-5 | Polyether | None | None | 4.6 | 15.3 |

TABLE Ib-continued

| Composition | Dispersion | Core Polymer | Shell Polymer | Type of Mixing | Drop Velocity at 15 kHz | Drop Velocity Variation at 15 kHz as % COV |
|---|---|---|---|---|---|---|
| Comparative 10 | PU-1 and PU-4 | Polyether | None | None | 5.3 | 10.2 |
| Comparative 11 | PU-1 and PU-4 | Polyether | None | None | 4.9 | 9.0 |
| Comparative 12 | PU-1 and PU-3 | Polyether | None | None | 5.6 | 8.6 |
| Invention 1 | PU-7 | Polyether | Polyether | Low-shear | 16.1 | 3.8 |
| Invention 2 | PU-8 | Polyether | Polyether | Low-shear | 16.0 | 3.5 |
| Invention 3 | PU-9 | Polyether | Polyether | Low-shear | 14.6 | 2.9 |
| Invention 4 | PU-10 | PDMS-polyether | Polyether | Low-shear | 16.0 | 1.4 |
| Invention 5 | PU-11 | PDMS-polyether | Polyether | Low-shear | 15.6 | 1.8 |
| Invention 6 | PU-12 | PDMS-polyether | Polyether | Low-shear | 14.5 | 1.6 |
| Invention 7 | PU-13 | PDMS-polyether | Polyether | Low-shear | 13.5 | 2.1 |
| Invention 8 | PU-14 | Polyether | Polyether | High-shear microfluidizer | 10.3 | 3.1 |
| Invention 9 | PU-15 | Polycarbonate | Polyether | Low-shear | 17.5 | 2.2 |
| Invention 10 | PU-16 | Polycarbonate | Polyether | High-shear mill | 10.0 | 4.9 |
| Invention 11 | PU-17 | PDMS-polyether | Polyether | High-shear mill | 18.0 | 4.0 |
| Invention 12 | PU-18 | PDMS-polyether | Polyether | High-shear mill | 9.7 | 3.0 |
| Invention 13 | PU-19 | Polyether | Polyether | High-shear mill | 9.4 | 3.4 |
| Invention 14 | PU-20 | Polyether with 0.5% acrylic | Polyether | Low-shear | 17.5 | 1.5 |
| Invention 15 | PU-21 | Polyether with 0.5% acrylic | Polyether | High-shear mill | 8.0 | 4.0 |
| Invention 16 | PU-22 | Polyether | Polyether | High-shear rotor-stator | 11.0 | 3.1 |
| Invention 17 | PU-23 | PDMS-polyether | Polyether | High-shear rotor-stator | 8.3 | 4.2 |
| Invention 18 | PU-24 | Polyether | Acrylic copolymer | High-shear rotor-stator | 13.2 | 2.9 |

Comparative Examples 1-5 show that while the compositions containing the 100 acid number polyurethane exhibited high drop velocity and low velocity variation, similar polyurethanes made with acid numbers of 50 or less caused very poor jetting with velocities of less than 5 msec and velocity variation greater than 8%. Comparative Examples 6-11 show that blending a small amount of high acid number polyurethane with low acid polyurethane in the ink jet ink compositions to obtain an overall dispersion low acid number does not improve the jetting performance, exhibiting drop velocities still well below 8 m/sec and velocity variations greater than 8%.

Invention Examples 1-3 show that use of the polyurethane core-shell dispersions with overall dispersion acid numbers of 50 or less provided excellent jetting performance with drop velocities above 8 m/sec and generally above 10 m/sec with the drop velocity variation less than 5%.

Invention Examples 4-7 show that core-shell dispersions with overall dispersion acid numbers as low as 20 in which the core polymer comprises poly(dimethylsiloxane) segments and the shell polymer is a high acid number polyurethane provide good jetting performance.

Invention Example 8 shows that an extremely high-sheer mixing device such as a microfluidizer can be used to produce very small core-shell particle size on the order of 0.1 µm while still providing good jetting performance.

Invention Examples 9 and 10 show that core-shell polyurethane particles can be made where the core polyurethane (acid number of 0) is a completely different composition from the shell polyurethane (acid number of 100). These core-shell polyurethane particles provided significantly higher drop velocity and velocity variation than a known low-acid number polycarbonate polyurethane dispersion (Comparative Example 6).

Invention Examples 11 and 12 show that core-shell polyurethane particles containing PDMS segments in the core polyurethane can provide dispersions with small particle sizes of about 0.1 to 0.5 µm depending on the amount of high-sheer mixing applied to the dispersion.

Invention Example 13 is an additional embodiment having very small core-shell particle sizes of 0.1 µm being produced by additional high sheer mixing after the dispersion was initially formed during the addition of the aqueous base to neutralize the acid groups on the shell polyurethane.

Invention Examples 14 and 15 show that core-shell polyurethane dispersions can be made in the presence of additional surface active polymers such as water soluble acrylic polymers that are dispersing agents.

Invention Examples 16 and 17 show that smaller core-shell particle size dispersions can be made by applying high sheer mixing during the addition of an aqueous base rather than after the dispersion is initially formed under low sheer conditions.

Inventive Example 18 shows that the core polymer in the core-shell polymer particles can be a hydrophobic acrylic polymer instead of a polyurethane.

Wet Abrasion Performance of Core-Shell Dispersions:

Ink jet ink compositions were used to ink jet image (print) a set of square checkerboard patches that can readily show smearing and composition removal due to dissolution and wiping after exposure to water. The printed targets were allowed to dry and age for at least 2 days before they were exposed to water. Then each patch was covered with a puddle of water administered by a dropper and allowed to stand for 5 minutes. One set of patches was wiped two times with lint-free water absorbent cloths and another patch was similarly wiped 4 times. Each patch was rated on a 1 to 5 scale for damage and smearing where a score of 1 (excellent) means no visible change and a score of 5 (poor) means significant removal of the ink jet ink composition. The results of these tests are shown below in TABLES IIa and IIb.

TABLE IIa

| Composition | Dispersion | Particle Type | 12 Day Wet Rub Rating (2 rubbings after 300 sec soak) | 12 Day Wet Rub Rating (4 rubbings after 300 sec soak) |
| --- | --- | --- | --- | --- |
| Comparative 1 | PU-1 | Homogeneous | 4 | 4 |
| Invention 11 | PU-17 | Core-shell | 1 | 3 |
| Invention 12 | PU-18 | Core-shell | 1 | 1 |
| Invention 13 | PU-19 | Core-shell | 1 | 2 |
| Invention 16 | PU-22 | Core-shell | 1 | 1 |
| Invention 17 | PU-23 | Core-shell | 2 | 1 |
| Invention 18 | PU-24 | Core-shell | 1* | 1* |
| Invention 19 | PU-25 | Core-shell | 1 | 1 |
| Invention 20 | PU-26 | Core-shell | 1* | 1* |
| Invention 21 | PU-27 | Core-shell | 1* | 1* |
| Invention 22 | PU-28 | Core-shell | 1 | 1 |

*These images were exposed to water and evaluated 2 days after ink jet printing.

TABLE IIb

| Composition | Core Polymer | Shell Polymer | Dispersion Acid Number | 12 Day Wet Rub Rating (2 rubbings after 300 sec Soak) | 12 Day Wet Rub Rating (4 rubbings after 300 sec Soak) |
| --- | --- | --- | --- | --- | --- |
| Comparative 1 | None | Poly-ether | 100 | 4 | 4 |
| Invention 11 | PDMS-poly-ether | Poly-ether | 50 | 1 | 3 |
| Invention 12 | PDMS-poly-ether | Poly-ether | 50 | 1 | 1 |
| Invention 13 | Poly-ether | Poly-ether | 50 | 1 | 2 |
| Invention 16 | Poly-ether | Poly-ether | 50 | 1 | 1 |
| Invention 17 | PDMS-poly-ether | Poly-ether | 50 | 2 | 1 |
| Invention 18 | Acrylic copolymer | Poly-ether | 40 | 1* | 1* |
| Invention 19 | Poly-ether | Poly-ether | 30 | 1 | 1 |
| Invention 20 | Poly-ether | Poly-ether | 30 | 1 | 1 |
| Invention 21 | Acrylic copolymer | Poly-ether | 50 | 1* | 1* |
| Invention 22 | Acrylic copolymer | Poly-ether | 30 | 1* | 1* |

*These targets were exposed to water and evaluated 2 days after printing.

TABLE IIa and IIb show that the wet abrasion performance when the known polyurethane was used was very poor with severe smearing of the test image, while the ink jet ink compositions prepared according to the present invention using the core-shell dispersions made with at least 50% of a hydrophobic polymer showed excellent wet abrasion performance with many examples showing no visible damage after exposure to water for 5 minutes and 4 wipes with the absorbent cloth.

Colorless Ink Jet Ink Compositions for Protective Overcoats:

Into an approximately 125 ml high density polyethylene bottle with magnetic stirring, the following components were added in order: high purity water, 0.02 weight % of the biocide Kordek® MLX, 5 weight % of glycerol, 10 weight % of ethylene glycol, 0.5 weight % of Surfynol® 465 surfactant, 4 weight % of either a known polyurethane dispersion of the prior art or a core-shell dispersion of the present invention, as described below in TABLE III. Each resulting 120 g of ink jet ink composition was stirred for at least an hour and filtered with a 1.0 µm disk filter.

Jetting Results:

Each ink jet ink composition was loaded directly into a thermal print head with a 3 pL (picoliter) nozzles. At a voltage of 12% above the threshold voltage for the ink jet ink composition to begin firing, the transit time for each drop to travel 0.3 mm from the nozzle plate was measured for 250 drops at each of a set of varying firing frequencies of from 0 to 25,000 Hz. The average velocity and the drop velocity expressed as the percent coefficient of variation of the velocity were calculated for 10 different nozzles fired at identical conditions. The results are shown below in TABLE III.

TABLE III

| Composition | Dispersion | Particle | Core Polymer | Shell Polymer | Type of Mixing | Particle Size (μm) | Dispersion Acid Number | Drop Velocity at 15 kHz | Drop Velocity Variation at 15 kHz as % COV |
|---|---|---|---|---|---|---|---|---|---|
| Comparative 13 | PU-1 | Homogeneous | Polyether | None | None | N/A | 100 | 22.9 | 1.2 |
| Comparative 14 | PU-2 | Homogeneous | Polyether | None | None | N/A | 50 | 2.9 | 17.1 |
| Invention 24 | PU-7 | Core-shell | Polyether | Polyether | Low-shear | 1.4 | 50 | 23.3 | 3.0 |
| Invention 25 | PU-8 | Core-shell | Polyether | Polyether | Low-shear | 1.4 | 40 | 21.9 | 3.1 |
| Invention 26 | PU-17 | Core-shell | PDMS-polyether | Polyether | High-shear mill | 0.52 | 50 | 20.0 | 2.3 |
| Invention 27 | PU-24 | Core-shell | Polyether | Acrylic co-polymer | High-shear rotor-stator | 0.10 | 40 | 11.6 | 2.2 |
| Invention 28 Ink prepared with 7.5 wt. % core-shell dispersion | PU-24 | Core-shell | Polyether | Acrylic co-polymer | High-shear rotor-stator | 0.10 | 40 | 11.4 | 2.2 |
| Invention 29 Ink prepared with 10 wt. % core-shell dispersion | PU-24 | Core-shell | Polyether | Acrylic co-polymer | High-shear rotor-stator | 0.10 | 40 | 10.4 | 4.1 |
| Invention 30 | PU-29 | Core-shell | Polyether | Acrylic co-polymer | High-shear rotor-stator | 0.11 | 50 | 10.2 | 2.6 |
| Invention 31 | PU-30 | Core-shell | Polyether | Acrylic co-polymer | High-shear rotor-stator | 0.13 | 40 | 11.3 | 1.8 |
| Invention 32 | PU-31 | Core-shell | Polyether | Acrylic co-polymer | High-shear rotor-stator | 0.14 | 30 | 11.3 | 2.2 |
| Invention 33 | PU-32 | Core-shell | Polyether | Acrylic co-polymer | High-shear rotor-stator | 0.17 | 20 | 10.8 | 2.1 |
| Invention 33 | PU-33 | Core-shell | Polyether | Acrylic co-polymer | High-shear rotor-stator | 0.21 | 10 | 9.6* | 2.9* |

*fired at 18% above threshold voltage

TABLE III shows that the dispersions of the present invention that were prepared with a highly hydrophobic core, either polyurethane or acrylic polymer, with a highly hydrophilic polyurethane shell exhibited excellent thermal jetting properties when formulated as a clear (colorless, non-pigmented) composition that are useful as protective overcoat applications. The Comparative Example 14 composition, however, jetted poorly with extremely low drop velocity and high velocity variation. Invention Examples 28 and 29 also showed that very high loading of at least 10 weight % of the core-shell dispersion is possible while retaining good jetting performance. Table III also shows that core-shell compositions of the present invention where the hydrophobic core accounted for up to 90 weight % of the core-shell polymer particles can be formulated into an ink jet ink composition having good jetting properties.

The invention has been described in detail with particular reference to certain preferred embodiments thereof, but it will be understood that variations and modifications can be effected within the spirit and scope of the invention.

The invention claimed is:

1. An aqueous ink jet ink composition comprising:
   a visible or invisible colorant, and
   a polymeric agent comprising core-shell polymeric particles,
   wherein the core of the core-shell polymeric particles comprises a polyurethane having an acid number of less than 10, and the shell of the core-shell polymeric particles comprises a water-soluble or water-dispersible polyurethane having an acid number of at least 70, and the weight ratio of the core to the shell is at least 50:50 and up to and including 90:10.

2. The aqueous ink jet ink composition of claim 1, wherein the core of the core-shell polymeric particles comprises a polyurethane having an acid number of 0 and up to and including 5, the shell of the core-shell polymeric particles comprises a water-soluble or water-dispersible polyurethane having an acid number of at least 100, and the weight ratio of the core to the shell is at least 50:50 and up to and including 70:30.

3. The aqueous ink jet ink composition of claim 1, wherein the core has an acid number of less than 5.

4. The aqueous ink jet ink composition of claim 1, wherein the shell has an acid number of at least 100 as provided by acidic groups.

5. The aqueous ink jet ink composition of claim 1, wherein the colorant is a visible non-fluorescing colorant.

6. The aqueous ink jet ink composition of claim 1, wherein the colorant is a visible or invisible fluorescing colorant.

7. The aqueous ink jet ink composition of claim 1, wherein the polymeric agent is present in an amount of at least 0.1 weight % and up to and including 20 weight %.

8. The aqueous ink jet ink composition of claim 1, further comprising a dispersing agent for the visible or invisible colorant.

9. The aqueous ink jet ink composition of claim 1, further comprising a humectant.

10. An aqueous ink jet ink composition comprising:
a polymeric agent comprising core-shell polymeric particles that is present in an amount of at least 0.5 weight % and up to and including 10 weight %,
wherein the core of the core-shell polymeric particles comprises a polyurethane having an acid number of less than 10, and the shell of the core-shell polymeric particles comprises a water-soluble or water-dispersible polyurethane having an acid number of at least 80, and the weight ratio of the core to the shell is at least 50:50 and up to and including 90:10.

* * * * *